(12) United States Patent
Spronken

(10) Patent No.: US 10,508,005 B2
(45) Date of Patent: Dec. 17, 2019

(54) ASSEMBLY FOR LIFTING OR SUPPORTING A LOAD, AND MEMBERS AND CONNECTORS FOR USE IN SAME

(71) Applicant: John Rene Spronken, Calgary (CA)

(72) Inventor: John Rene Spronken, Calgary (CA)

( * ) Notice: Subject to any disclaimer, the term of this patent is extended or adjusted under 35 U.S.C. 154(b) by 0 days.

(21) Appl. No.: 15/684,316

(22) Filed: Aug. 23, 2017

(65) Prior Publication Data
US 2019/0002246 A1    Jan. 3, 2019

(30) Foreign Application Priority Data
Jun. 28, 2017 (CA) .................................... 2972085

(51) Int. Cl.
*B66C 1/22* (2006.01)
*E04B 1/24* (2006.01)
(Continued)

(52) U.S. Cl.
CPC .................. *B66C 1/22* (2013.01); *E04B 1/19* (2013.01); *E04B 1/1909* (2013.01); *E04B 1/1912* (2013.01); *E04B 1/24* (2013.01); *E04B 1/2403* (2013.01); *E04C 3/005* (2013.01); *E04C 3/04* (2013.01); *E04G 21/142* (2013.01);
(Continued)

(58) Field of Classification Search
CPC ... B66C 1/22; B66C 1/28; E04C 3/005; E04C 3/22; E04C 3/30; E04B 1/2403; E04B 1/19; E04B 2001/2496; E04B 2001/246; E04B 2001/2418; E04B 2001/2457; E04B 2001/1957; E04B 2/08
USPC ........ 294/81.2, 81.1; 52/649.2, 649.6, 653.2, 52/848, 849, 854, 855, 125.6, 655.1, 464,
(Continued)

(56) References Cited

U.S. PATENT DOCUMENTS 1,941,348 A * 12/1933 Hathorn .................... B64C 3/00
                                                                       244/131
2,975,910 A *  3/1961 Conrad ................... B66C 23/36
                                                                       212/300
(Continued)

FOREIGN PATENT DOCUMENTS

CA        2783260 A1    10/2015
CA        2872577 A1     5/2016

OTHER PUBLICATIONS

Sparta Designing Solutions article, Publication date unknown, copyright notation on web page is 2013, http://www.spartaengineering.com/need-spreader-bar/.

*Primary Examiner* — Robert Canfield
*Assistant Examiner* — Matthew J Gitlin
(74) *Attorney, Agent, or Firm* — Reichel Stohry Dean LLP; Mark C. Reichel; Natalie J. Dean

(57) ABSTRACT

Provided herein is an assembly for carrying or supporting a load. The assembly comprises a plurality of members connectable in an assembled arrangement for carrying or supporting the load. Each member comprises a first end and a second end, at least one of the first end and the second end has a pair of connecting members comprising two lugs that each has defined therein two holes. The lugs are configured for alignment with a corresponding pair of lugs formed on another member in the assembly. Fasteners extend through the holes formed in the lugs when the holes are aligned. Further provided are members for use in the assembly and connector elements for attaching two or more members in the assembly.

29 Claims, 34 Drawing Sheets

(51) Int. Cl.
*E04B 1/19* (2006.01)
*E04C 3/00* (2006.01)
*E04C 3/04* (2006.01)
*E04G 21/14* (2006.01)
*F16B 7/18* (2006.01)

(52) U.S. Cl.
CPC ...... *F16B 7/185* (2013.01); *E04B 2001/1915* (2013.01); *E04B 2001/1957* (2013.01); *E04B 2001/246* (2013.01); *E04B 2001/2418* (2013.01); *E04B 2001/2457* (2013.01); *E04B 2001/2496* (2013.01); *E04B 2103/06* (2013.01); *E04C 2003/0465* (2013.01)

(58) Field of Classification Search
USPC .......... 52/643, 638, 574; 446/122, 123, 124; 212/177, 300, 168; 403/49, 73, 85
See application file for complete search history.

(56) References Cited

U.S. PATENT DOCUMENTS

| | | | |
|---|---|---|---|
| 3,507,526 A * | 4/1970 | Walker | E04B 1/19 403/173 |
| 4,200,946 A * | 5/1980 | Lawrence | E01D 6/00 14/14 |
| 4,382,712 A * | 5/1983 | Buchs | E04C 2/526 156/172 |
| 4,509,879 A * | 4/1985 | Pearce | E04B 1/1903 403/172 |
| 5,082,128 A * | 1/1992 | Franzen | B66C 23/70 212/177 |
| 5,711,131 A * | 1/1998 | Thomas | E04C 3/08 403/170 |
| 6,412,649 B1 | 7/2002 | Khachaturian | |
| 7,197,856 B2 * | 4/2007 | Coles | E04C 3/005 52/638 |
| 8,382,175 B2 | 2/2013 | DiMartino | |
| 8,517,397 B2 * | 8/2013 | Gross | E04C 3/005 280/35 |
| 8,720,152 B2 * | 5/2014 | Kempf | E04B 1/2403 52/167.1 |
| 8,764,082 B2 * | 7/2014 | Krogh | B66C 1/108 294/67.33 |
| 9,051,159 B2 * | 6/2015 | Walker | B66C 23/70 |
| 9,896,852 B2 * | 2/2018 | Apostolopoulos | E04G 5/06 |
| 2005/0199567 A1 | 9/2005 | Tardiff | |
| 2008/0173605 A1 * | 7/2008 | Willim | B66C 23/68 212/177 |
| 2009/0058117 A1 * | 3/2009 | Di Martino | B66C 1/22 294/81.5 |
| 2011/0140469 A1 * | 6/2011 | Plair | B66C 1/105 294/81.1 |
| 2011/0284490 A1 * | 11/2011 | Liu | B66C 23/70 212/347 |

* cited by examiner

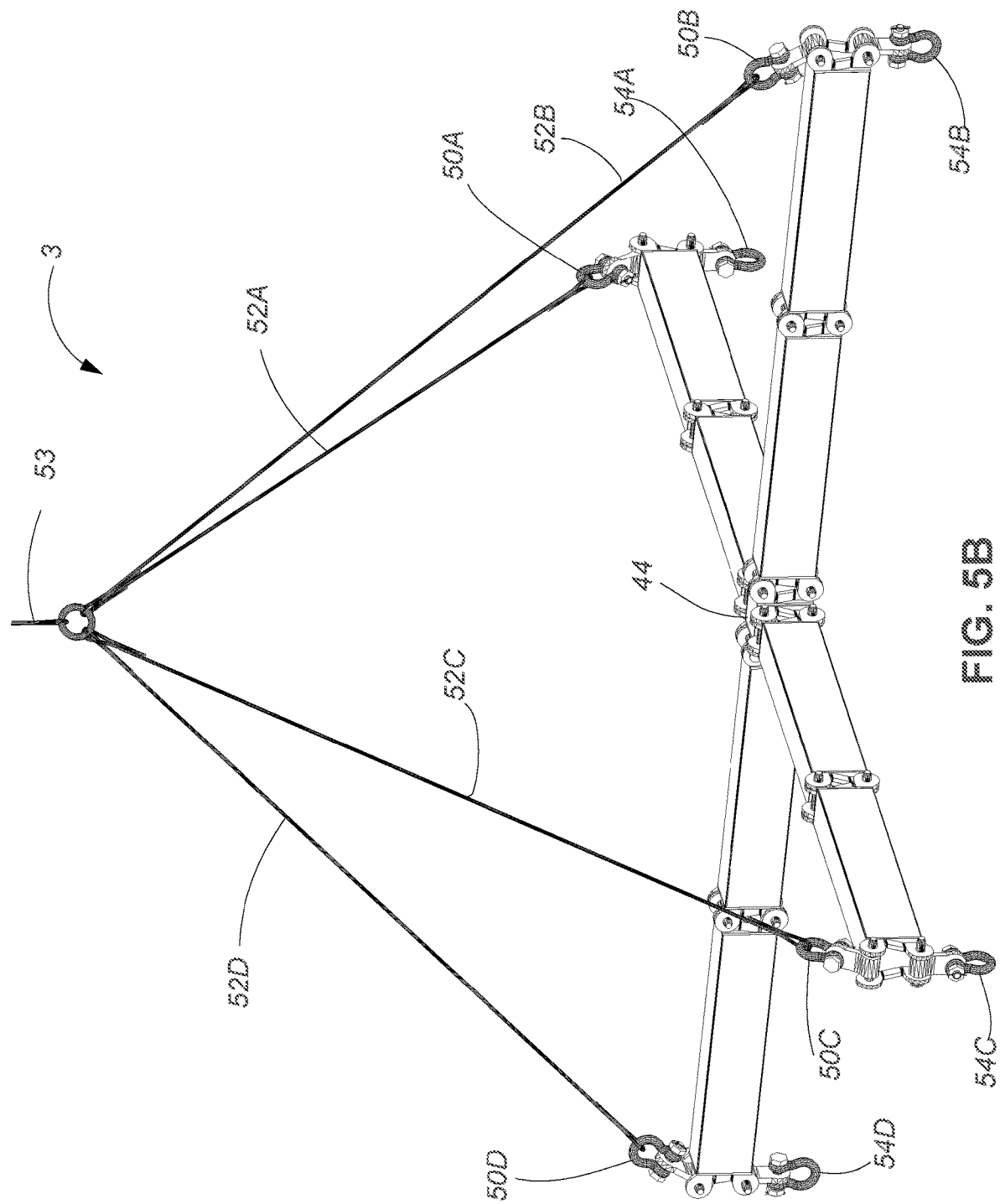

ASSEMBLY FOR LIFTING OR SUPPORTING A LOAD, AND MEMBERS AND CONNECTORS FOR USE IN SAME

PRIORITY

The present application is related to, and claims the priority benefit of, Canadian patent application serial no. 2972085, filed Jun. 28, 2016, the entire contents of which are hereby incorporated into the present application directly and by reference.

TECHNICAL FIELD

Provided herein is an assembly for lifting, supporting or distributing a load and members for use in the assembly. Also provided are connectors for connecting two or more members in the assembly.

BACKGROUND

A spreader bar assembly is a lifting device used to aid in the lifting of heavy loads. Spreader bar assemblies re-orient the lifting load to distribute the load across more than one point. This can increase stability and decrease the loads applied during hoisting. While spreader bars are common in the industry, most are custom made to the exact length required to handle a load of a given size. However, custom fabrication is not only expensive but time consuming. Another option available is to design the spreader bar assembly so that the end of one bar slides telescopically within another end or to provide multiple holes in a bar in the assembly to which a load is supported. Although such configurations can simplify adjustment of the length of the spreader bar assembly, a drawback is that the assemblies are often heavy and thus difficult for a single person to carry and assemble on-site. Thus, spreader bar assemblies are typically transported on large trucks, which can be inconvenient, and add significant cost.

Assemblies comprising bars or other connecting members can also be used in other applications besides spreader bar assemblies to lift, support or re-distribute loads. This includes applications in which a load is to be redistributed across more than one point, ranging from shoring frames to large space frames, such as frames for light industrial building structures. However, assembling and disassembling such structures is subject to the same disadvantages described with reference to spreader bar assemblies. Likewise, the members making up the assemblies often need to be custom fabricated.

Accordingly, it would be advantageous to provide an assembly for lifting, supporting or distributing a load that is simple in construction, easy to assemble and adjustable to a desired dimension or configuration. The embodiments disclosed herein seek to address the problems in such known assemblies or to provide one or more useful alternatives.

BRIEF SUMMARY

According to one exemplary embodiment, there is provided an assembly comprising: a plurality of members connectable in an assembled arrangement for supporting, carrying or distributing a load; each member comprising a first end and a second end, at least one of the first end and the second end of each member has a pair of connecting members, each connecting member comprising two lugs that have two respective holes therethrough; which pair of connecting members are configured for interconnection with a corresponding pair of connecting members formed on another member in said assembly for connection thereto, the corresponding pair of connecting members each comprising two lugs that have two respective holes therethrough; and fasteners that each comprise a shaft that extends through the holes formed in said lugs when the holes in the lugs of each pair of connecting members lugs are aligned with the holes in the lugs of the corresponding pair of connecting members on the other member.

In one embodiment, the two lugs of each connecting member are horizontally off-set from one another.

According to another embodiment, there is provided a member for use in an assembly, said assembly comprising a plurality of members connectable in an assembled arrangement for supporting, carrying or distributing a load, the member for use in said assembly comprising: a first end and a second end, at least one of the first end and the second end has a pair of connecting members, each connecting member comprising two lugs that have two respective holes therethrough; which pair of connecting members are configured for interconnection with a corresponding pair of connecting members formed on another member in said assembly for connection thereto by fasteners, the corresponding pair of connecting members each comprising two lugs that have two respective holes therethrough; and the two lugs on the member for use in said assembly being off-set from one another.

According to a further embodiment, there is provided a connector element for connecting two or more members in an assembly for supporting, carrying or distributing a load, the connector element comprising: a central element having at least two pairs of connecting members, each connecting member comprising two lugs that have two respective holes therethrough, wherein the two lugs are off-set with respect to one another; and which pair of connecting members are configured for interconnection with a corresponding pair of connecting members formed on another member in said assembly for connection thereto, the corresponding pair of connecting members each comprising two lugs that have two respective holes therethrough.

BRIEF DESCRIPTION OF THE DRAWINGS

FIG. 5B shows the spreader bar assembly of FIG. 5A in three dimensions lifting a load.

DETAILED DESCRIPTION

Figure 1A:
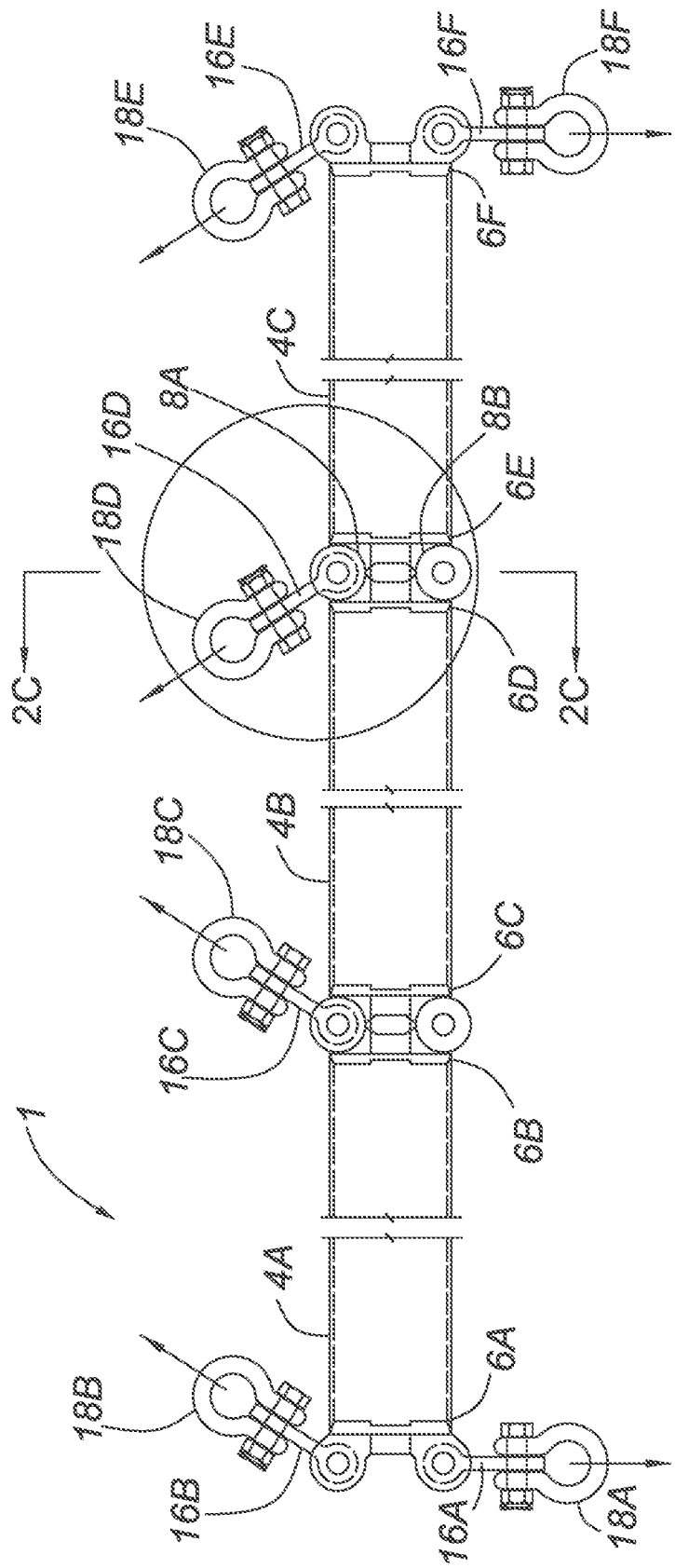
FIG. 1A shows a spreader bar assembly according to one embodiment.
Figure 1B:
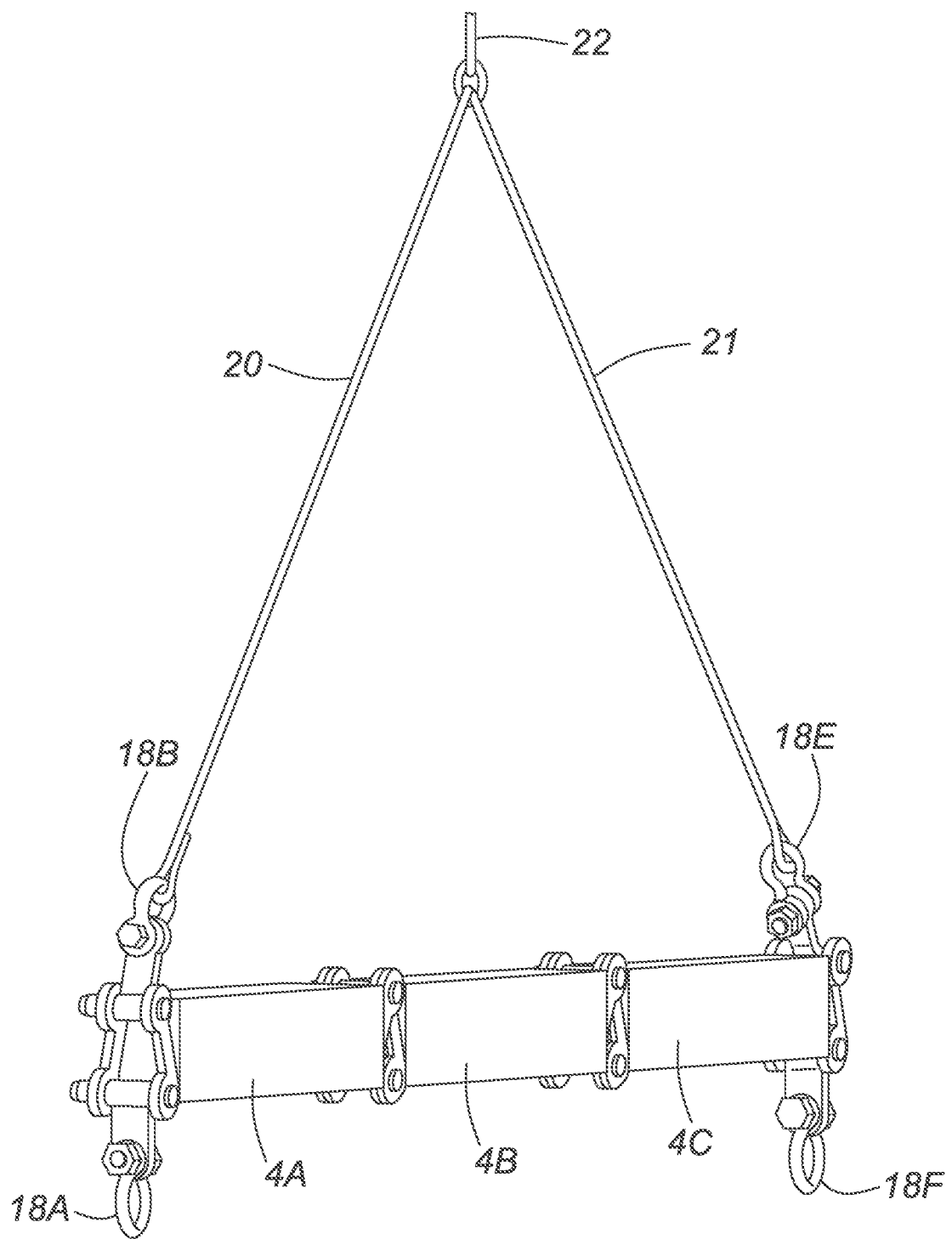
FIG. 1B shows a spreader bar assembly lifting a load.

FIG. 1A depicts a side plan view of spreader bar assembly 1 according to a first embodiment. The spreader bar assembly 1 comprises a plurality of spreader bars 4A, 4B and 4C connectable in an assembled arrangement for carrying a load. The assembled arrangement is shown in FIG. 1B.

Each spreader bar 4A, 4B and 4C comprises a first end and a second end, depicted here by reference numbers 6A, 6B, 6C, 6D, 6E and 6F. The first and the second end of each spreader bar 4A, 4B and 4C has a pair of outwardly extending connecting members, each connecting member comprising two lugs that each have a hole formed therethrough. This is depicted in FIGS. 2A-2D, which shows the circled region of FIG. 1A in more detail.

Figure 2A:
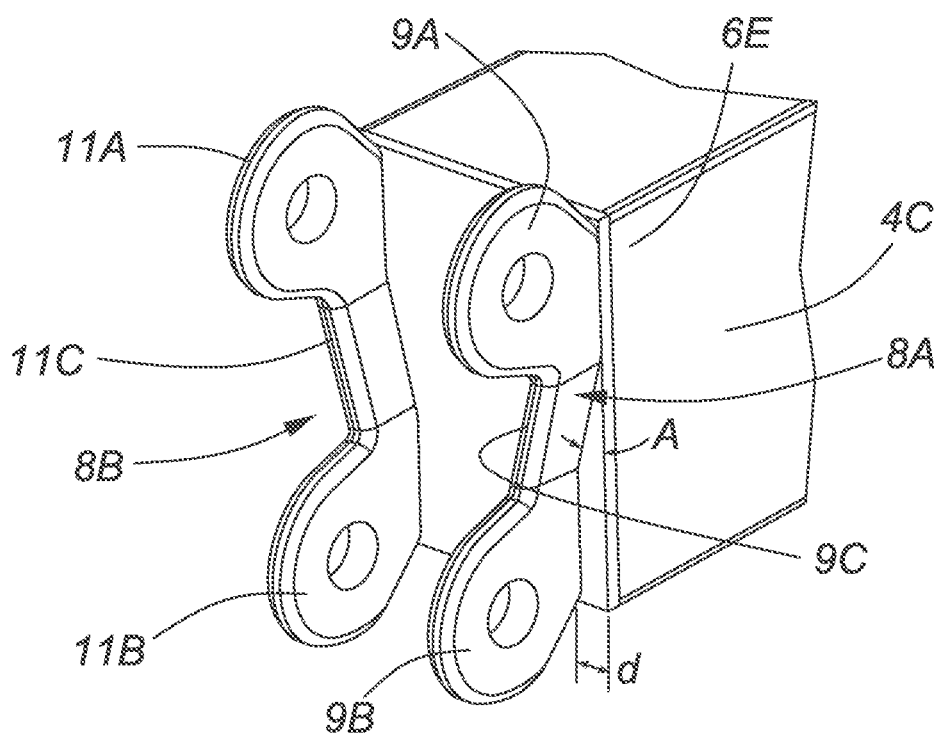
FIG. 2A depicts a pair of connecting members on one end of a bar in the spreader bar assembly.

FIG. 2A shows the end of bar 4C of FIG. 1A having the two outwardly extending connecting members depicted as 8A and 8B. As shown in FIG. 2A, there are two lugs, 9A and 9B, formed on the connecting member 8A. Likewise, connecting member 8B comprises two lugs 11A and 11B. Since connecting members 8A and 8B are of a similar arrangement, for brevity, only connecting member 8A is discussed in more detail below.

The lug 9A of connecting member 8A is off-set horizontally with respect to lug 9B by an off-set distance shown in FIG. 2A as d. In this embodiment, a tie 9C is formed between the two lugs 9A and 9B to provide continuity between the lugs 9A, 9B. The tie 9C is angled inwardly from the adjacent edge of the bar 4C as shown to join lug 9A and lug 9B. The angle of tie 9C with respect to the adjacent edge of bar 4C is shown as A in the drawing. Such an off-set orientation of the lugs 9A and 9B on spreader bar 4C facilitates complementary interconnection with a corresponding pair of lugs on another spreader bar, as described further below. As noted above, lugs 11A and 11B and tie 11C of connecting member 8B are configured in a similar manner.

Figure 2B:
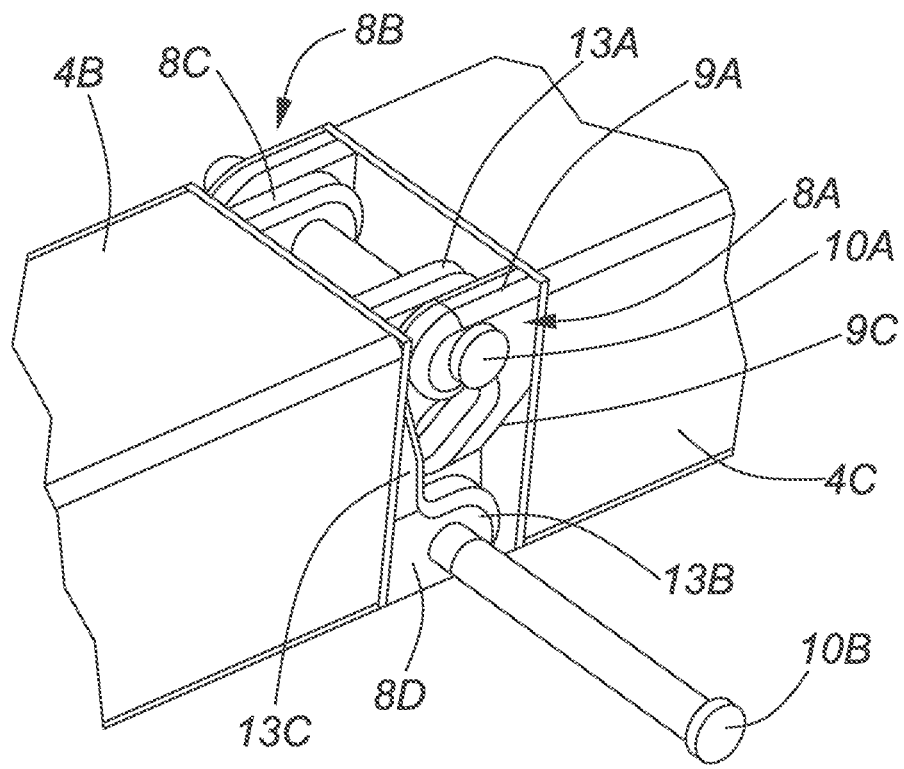
FIG. 2B depicts two bars in a spreader bar assembly connected by respective pairs of connecting members.

FIG. 2B shows the pair of connecting members 8A and 8B on the end of bar 4C connected to a complementary pair of connecting members 8C and 8D formed on the end of bar 4B (shown in FIG. 1A). The pair of connecting members 8C and 8D each comprises lugs (some of which are obscured in the drawing) that are horizontally off-set on the end of bar 4B in a similar manner as described above for connecting members 8A and 8B. However, when the connecting members 8A and 8B are aligned for connection with corresponding connecting members 8C and 8D, they are oriented in opposite configurations as shown in FIG. 2B. For example, in the orientation shown in FIG. 2B, the tie 9C of connecting member 8A is angled inwardly from the top lug 9A to the bottom lug 9B (as described above) and the corresponding tie 13C of connecting member 8D is angled inwardly from the bottom lug 13B to the top lug 13A. Such an orientation allows the lugs 9A and 9B of connecting member 8A to interconnect with lugs 13B and 13A of connecting member 8D in a staggered configuration after fasteners 10A and 10B are inserted through aligned holes formed in lugs 9A, 9B, 13A and 13B.

Figure 2C:
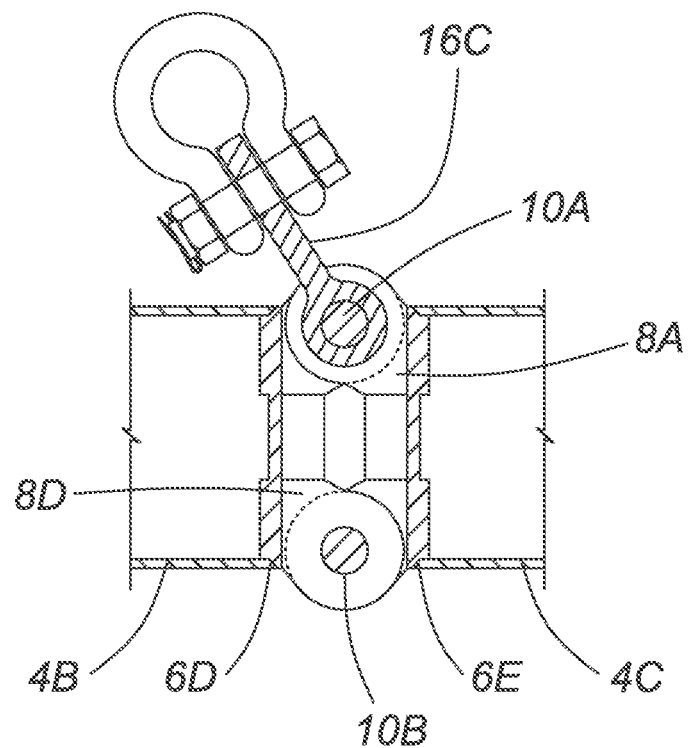
FIG. 2C is a side view of two bars of the assembly attached via the connecting members.
Figure 2D:
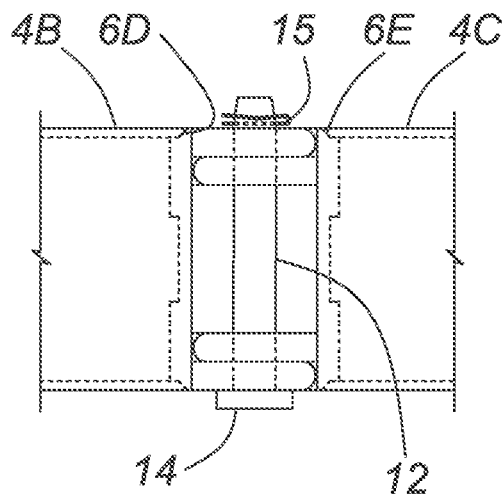
FIG. 2D is a plan view of two bars of the assembly attached via the connecting members.
Figure 2E:
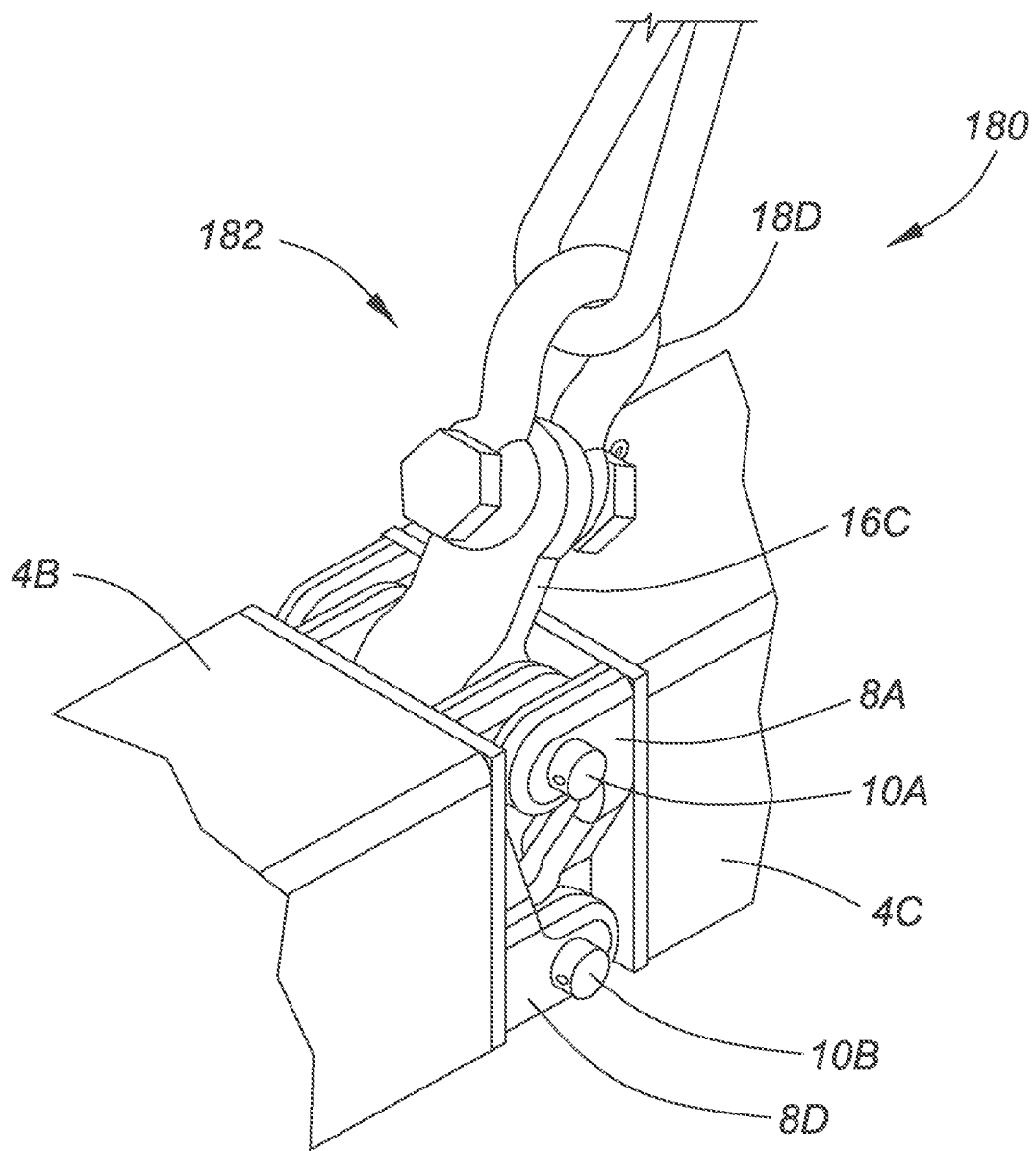
FIG. 2E is a three-dimensional view of two bars of the assembly attached via the connecting members and in which a lifting member is attached thereto.

FIG. 2C is a side view that shows the circled area of FIG. 1A in more detail. Connecting members 8A and 8D are shown in the drawing, while connecting members 8B and 8C are obscured from view. FIG. 2D is a plan view of FIG. 2C. FIG. 2E is a three-dimensional depiction of the two pairs of connecting members that connect bars 4B and 4C similar to the drawing of FIG. 2B but showing a shackle 18D attached via a shackle bracket 16C to fastener 10A. The shackle bracket is described in more detail below. Alternatively, a truss diagonal (also referred to herein as a brace) can be mounted on fastener 10A as shown in FIGS. 7C and 7D described below. The space between adjacent lugs through which a fastener is inserted may be sufficient to accommodate either a shackle bracket or a truss diagonal. As will be appreciated by those of skill in the art, other members could be mounted on the fasteners and the foregoing embodiments are only illustrative.

In the embodiments depicted in the figures, the fasteners 10A and 10B are pins. This is shown more clearly in FIG. 2D, which is a side view of the aligned pairs of connecting members shown in FIG. 1A and FIG. 2B. As shown in FIG. 2D, the pin is of standard construction and comprises a shaft 12, a head 14 and a cotter pin 15 for securing the shaft in place.

Referring again to FIG. 1A, the assembly 1 comprises lifting members 16A, 16B, 16C, 16D, 16E and 16F that are each rotatably attached to a respective shaft of each fastening element. In this embodiment, the lifting members 16A, 16B, 16C, 16D, 16E and 16F comprise shackle brackets. Each lifting member 16A, 16B, 16C, 16D, 16E and 16F is attached to a respective shackle 18A, 18B, 18C, 18D, 18E and 18F.

As depicted in FIG. 1B, when the spreader bar is assembled, the spreader bars 4A, 4B and 4C are coupled end-to-end in a linear configuration. The shackles 18B and 18E accept hooks attached to cables 20 and 21. A central cable 22 is attached to a lifting device such as a crane (not shown). Shackles 18A and 18F are attached to a load via cables and the like (not shown).

Figure 3A:
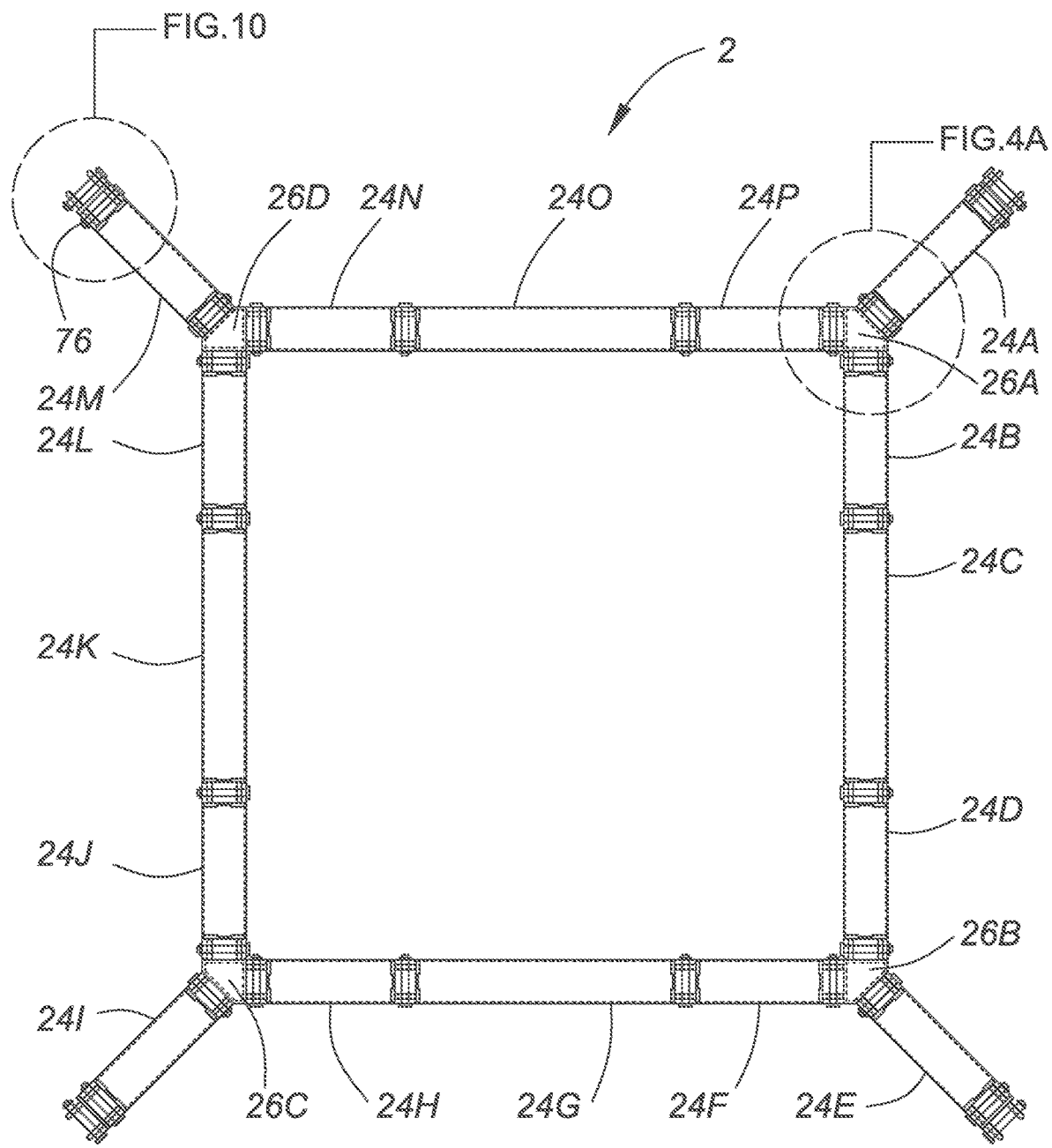
FIG. 3A is an example of an assembled spreader bar assembly.

While FIG. 1B shows a spreader bar assembly layout in which the spreader bars are attached end-to-end, FIG. 3A shows an alternative layout in which the spreader bars are arranged using four three-way connectors to attach the spreader bars in a square configuration.

As shown in FIG. 3A, the assembled spreader bar assembly 2 comprises a plurality of spreader bars 24A, 24B, 24C, 24D, 24E, 24F, 24G, 24H, 24I, 24J, 24K, 24L, 24M, 24N, 24O and 24P. The four corners of the assembled spreader bar assembly 1 comprise respective three-way connectors 26A, 26B, 26C and 26D.

Figure 4A:
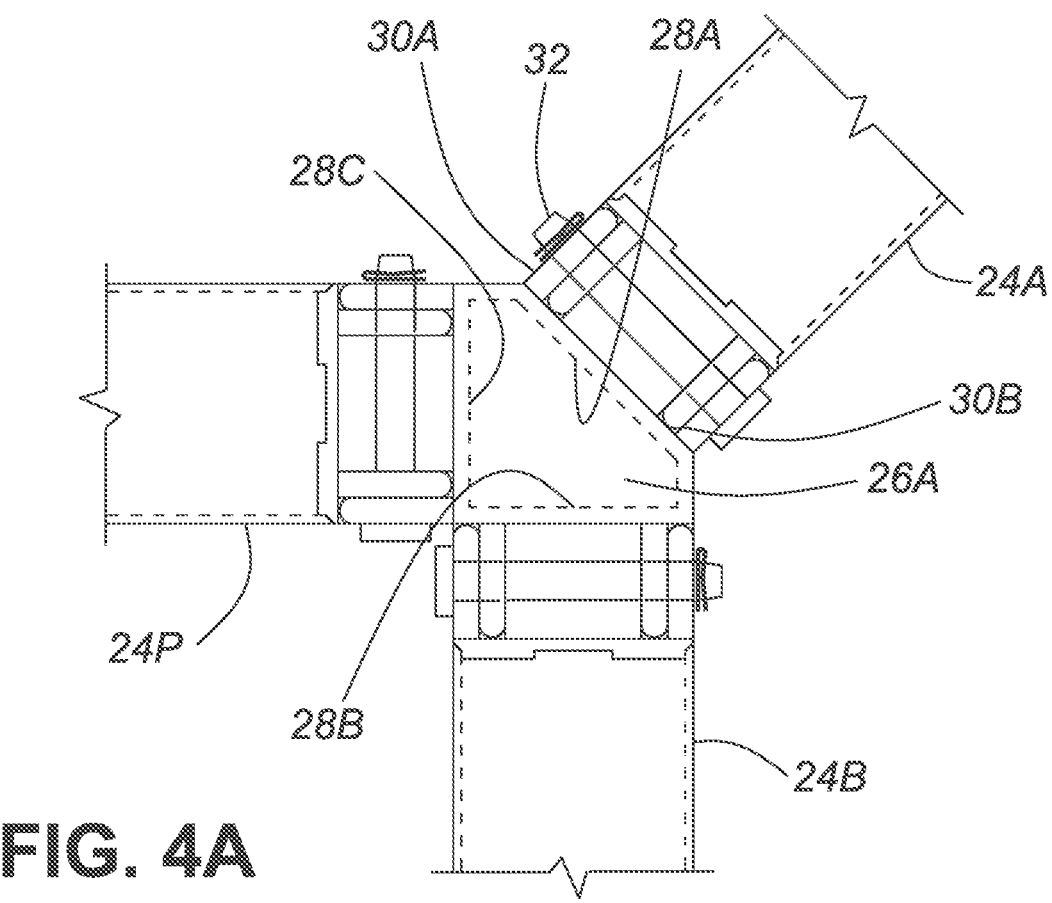
FIG. 4A shows a three-way connector element according to one embodiment.
Figure 4B:
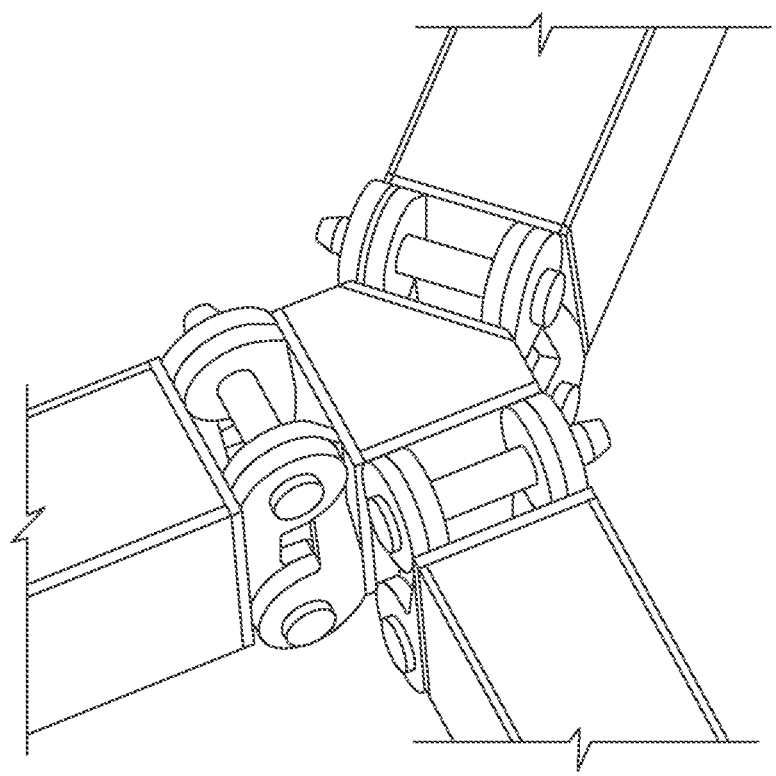
FIG. 4B is a three dimensional depiction of the three-way connector element.

The three-way connector 26A depicted in FIG. 3A is shown in more detail in FIG. 4A (see the circled region of FIG. 3A). As shown in FIG. 4A, the three-way connector has three sides (also referred to as faces) 28A, 28B and 28C, each comprising pairs of connecting members that in turn comprise two lugs that extend outwardly and are off-set as described. For example, side 28A has a pair of connecting members 30A and 30B that connect to similar connecting members on spreader bar 24A via two pins, one of which is shown as pin 32 in FIG. 4A. The other sides 28B and 28C contain identical connecting members comprising lugs to connect to complementary lugs on spreader bars 24B and 24P, respectively. For simplicity, reference numbers are omitted to describe these latter elements. FIG. 4B is a three-dimensional depiction of the three-way connector depicted in FIG. 4A.

Figure 3B:
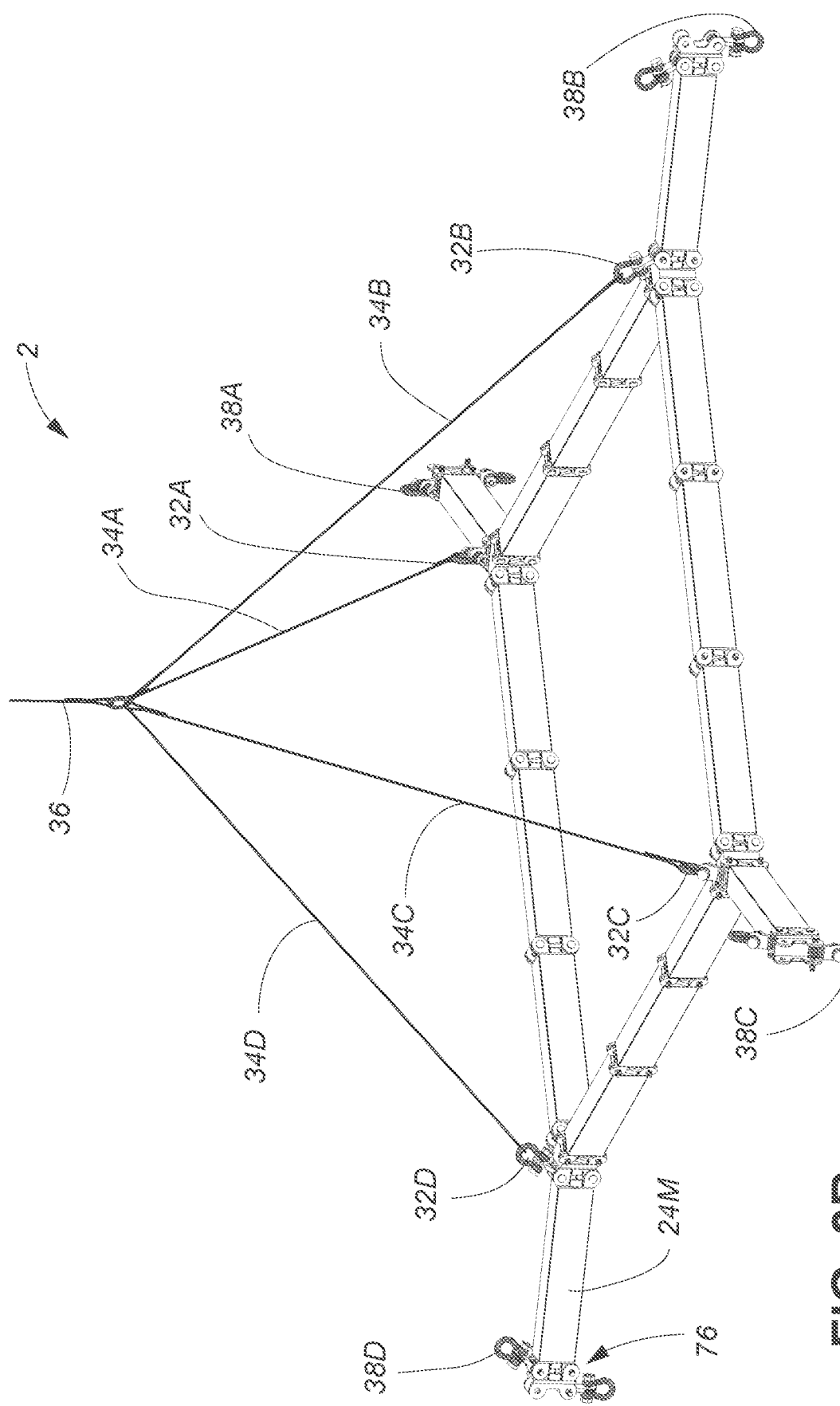
FIG. 3B is another example of an assembled spreader bar assembly.

The assembled spreader bar assembly is shown in three-dimension in FIG. 3B. The spreader bar assembly 2 comprises shackles 32A, 32B, 32C and 32D mounted on respective shackle brackets that are rotatably attached to pins in the three-way connector in a same manner as described with reference to FIG. 2A. The shackles 32A, 32B, 32C and 32D accept hooks attached to cables 34A, 34B, 34C and 34D. A central cable 36 is attached to a lifting device such as a crane (not shown). Shackles 38A, 38B, 38C and 38D are attached to a load (not shown). These shackles are part of an extension bracket assembly, which is described in more detail below with respect to FIGS. 8A, 8B and 8C.

Figure 5A:
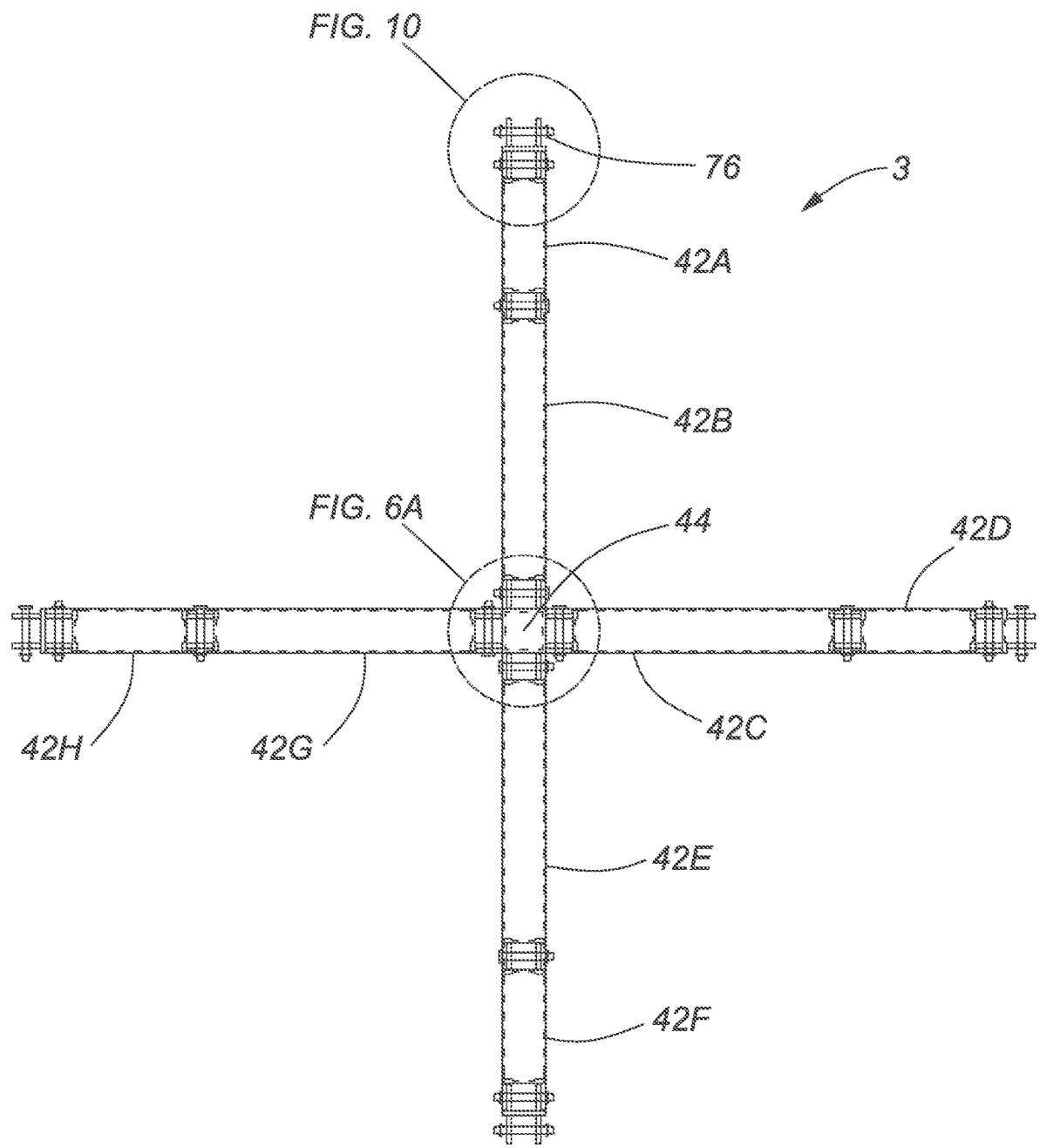
FIG. 5A is another example of an assembled spreader bar assembly.

FIG. 5A shows an alternative layout using a four-way connector to attach the spreader bars.

As shown in FIG. 5A, the assembled spreader bar assembly 3 comprises a plurality of spreader bars 42A, 42B, 42C, 42D, 42E, 42F, 42G and 42H. The center of the assembled spreader bar assembly comprises a four-way connector 44.

Figure 6A:
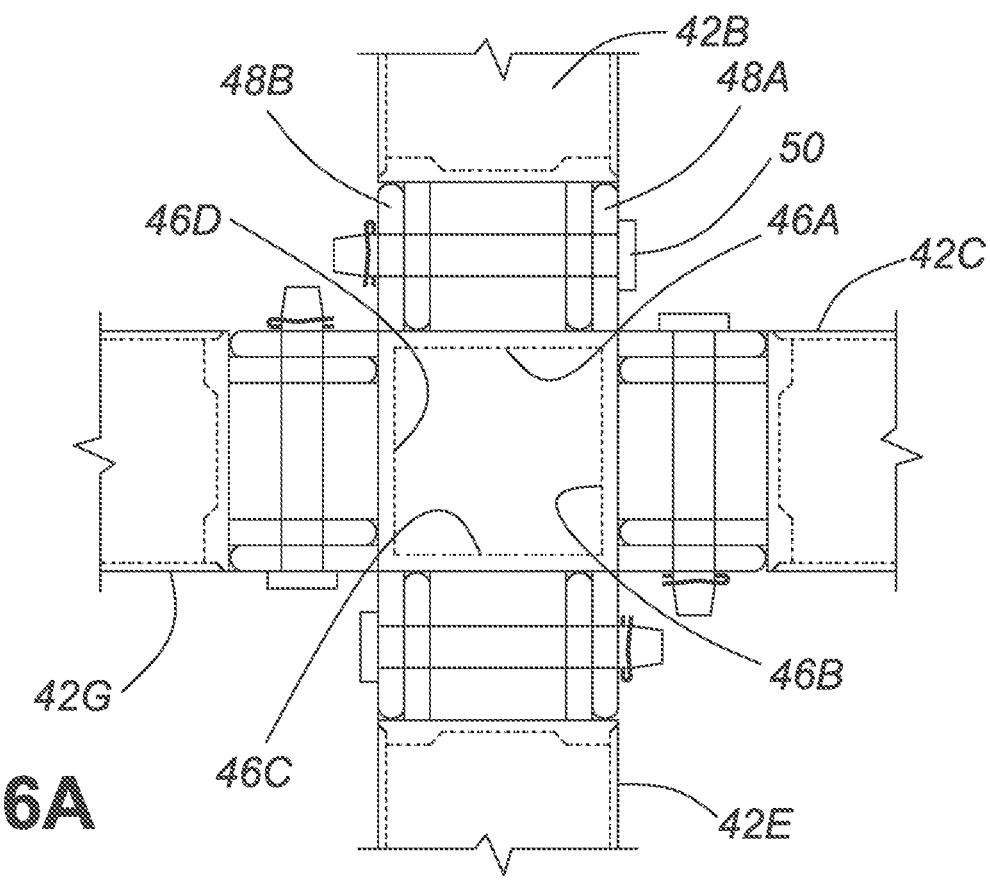
FIG. 6A is a four-way connector element according to one embodiment.
Figure 6B:
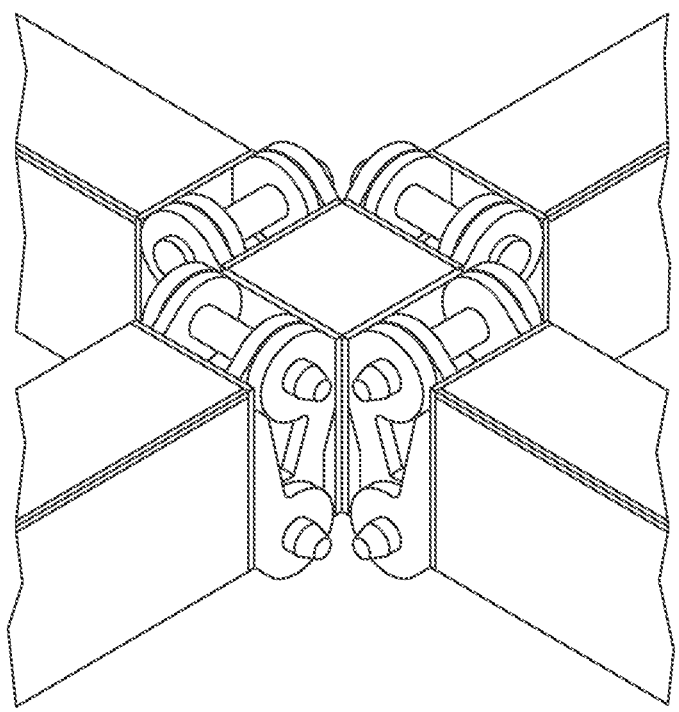
FIG. 6B is a three dimensional depiction of the four-way connector element.

The four-way connector 44 depicted in FIG. 5A is shown in more detail in FIG. 6A (see the circled region of FIG. 5A). As shown in FIG. 6A, the four-way connector has four sides (or faces) 46A, 46B, 46C and 46D each comprising pairs of connecting members that extend outwardly. For example, side 46A has a pair of outwardly extending connecting members 48A comprising two lugs and 48B that connect to similar, but oppositely oriented connecting members comprising two lugs in spreader bar 42B via pins, one of which is shown as pin 50 in FIG. 6A. In this non-limiting embodiment, the sides 46B, 46C and 46D contain identical outwardly extending connecting members comprising lugs to connect to lugs of connecting members in spreader bars 42C, 42E and 42G, respectively. For simplicity, reference numbers are omitted to describe these latter elements. FIG. 6B is a three-dimensional depiction of the four-way connector shown in FIG. 6A.

The assembled spreader bar assembly is shown in FIG. 5B. The spreader bar assembly 3 comprises shackles 50A, 50B, 50C and 50D mounted on respective shackle brackets that are rotatably attached to pins in an extension bracket assembly (described in more detail below). The shackles 50A, 50B, 50C and 50D accept hooks attached to cables 52A, 52B, 52C and 52D.

A central cable 53 is attached to a lifting device such as a crane (not shown). Shackles 54A, 54B, 54C and 54D are attached to a load via cables (not shown). Although shackles and shackle brackets are described, other members could be used to lift a load via cables.

Figure 7A:
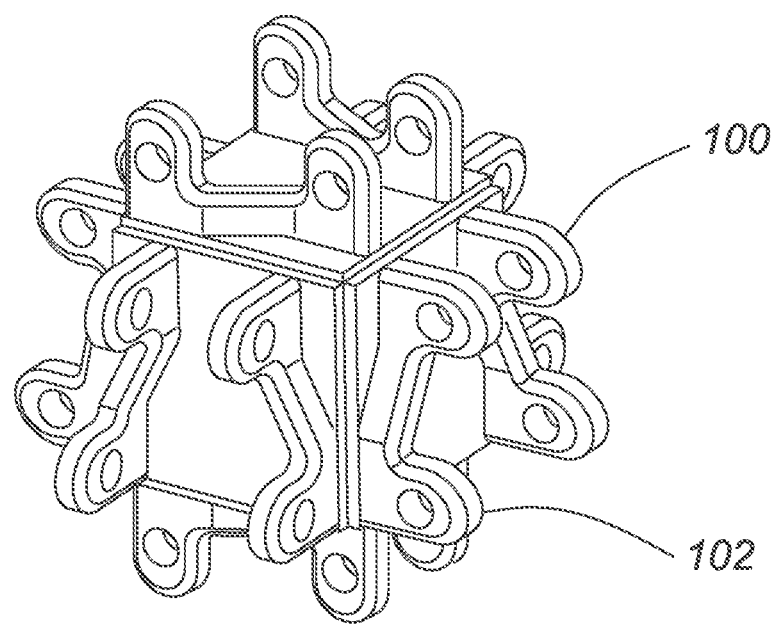
FIG. 7A is a three dimensional depiction of a six-way connector element.
Figure 7B:
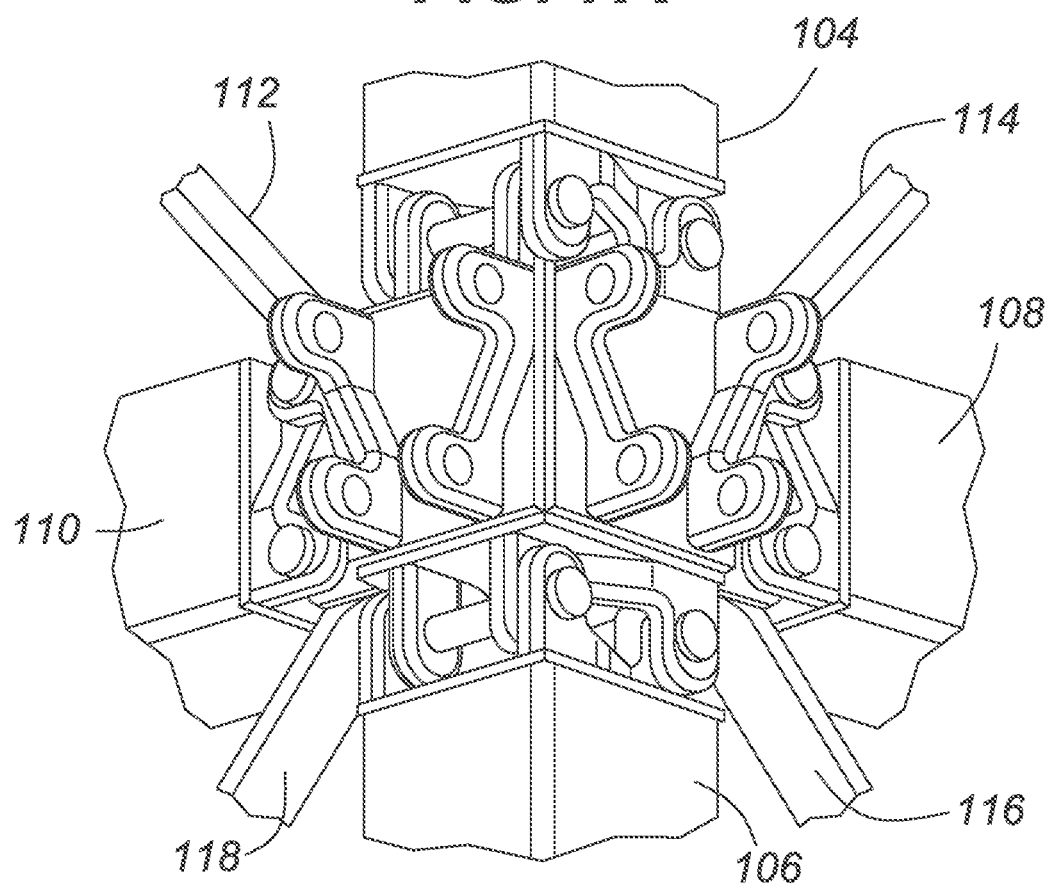
FIG. 7B is a three dimensional depiction of the six-way connector element shown attached to other members in the assembly.
Figure 7C:
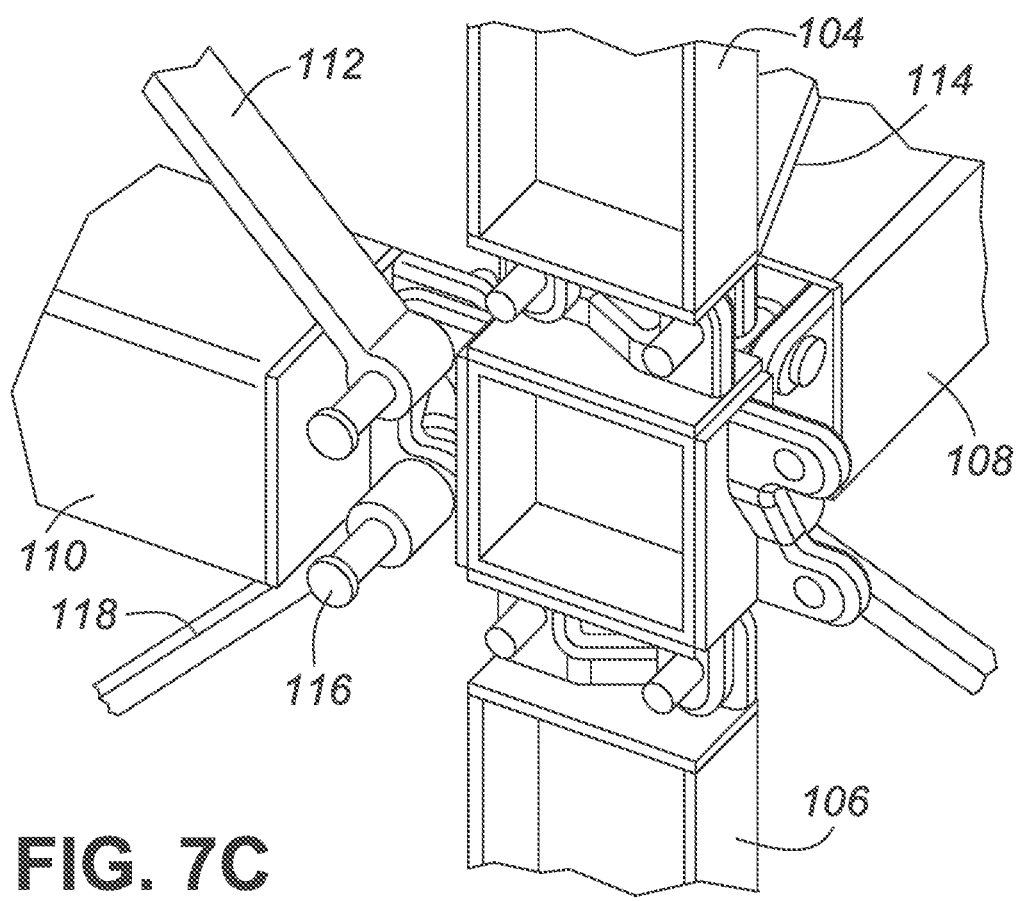
FIG. 7C is another three dimensional depiction of the six-way connector element shown attached to other members in the assembly.
Figure 7D:
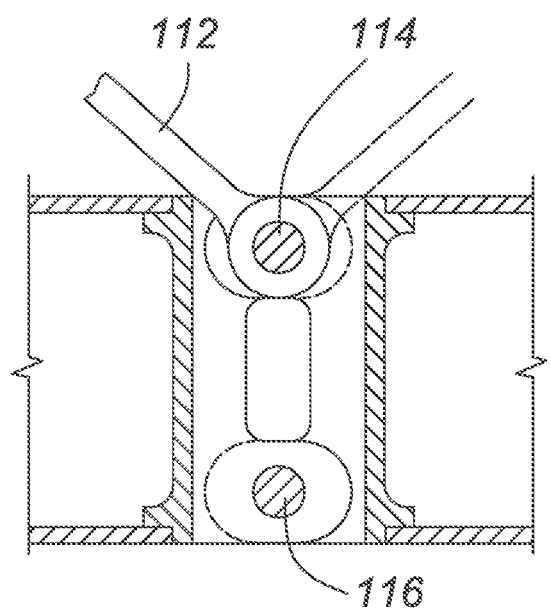
FIG. 7D a side plan view of FIG. 7C showing a brace rotatably mounted to a pin of the connecting member.

FIG. 7A shows a six-way connector, in which each face of the connector comprises connecting members having lugs. Connecting members on one face of the six-way connector are labelled 100 and 102, but the references numbers are omitted on the remainder of the connecting members comprising lugs for brevity. FIG. 7B shows the six-way connector attached to bars 104, 106, 108 and 110 when connected in an assembled arrangement. The assembled arrangement in this case can be a spreader bar assembly or another structure, such as a building frame as discussed below. The assembled arrangement also comprises braces 112, 114, 116 and 118 rotatably attached to pins connecting the pairs of opposing lugs formed on the connecting members.

FIG. 7C is a three-dimensional isometric section of FIG. 7B and like reference numbers depict identical parts among the drawings.

FIG. 7D a side plan view of FIG. 7C showing brace 112 rotatably mounted to pin 114. As shown in FIG. 7D, brace 112 within the assembled structure has a rotation limit of around 140 degrees. As would be appreciated by those of skill in the art, the precise rotation limit will depend on the configuration. A rotation limit is advantageous in that such an arrangement provides increased carrying capacity and shear capacity of the joint by adding the advantages of truss action by joining single members into a two-part unit.

Figure 7E:
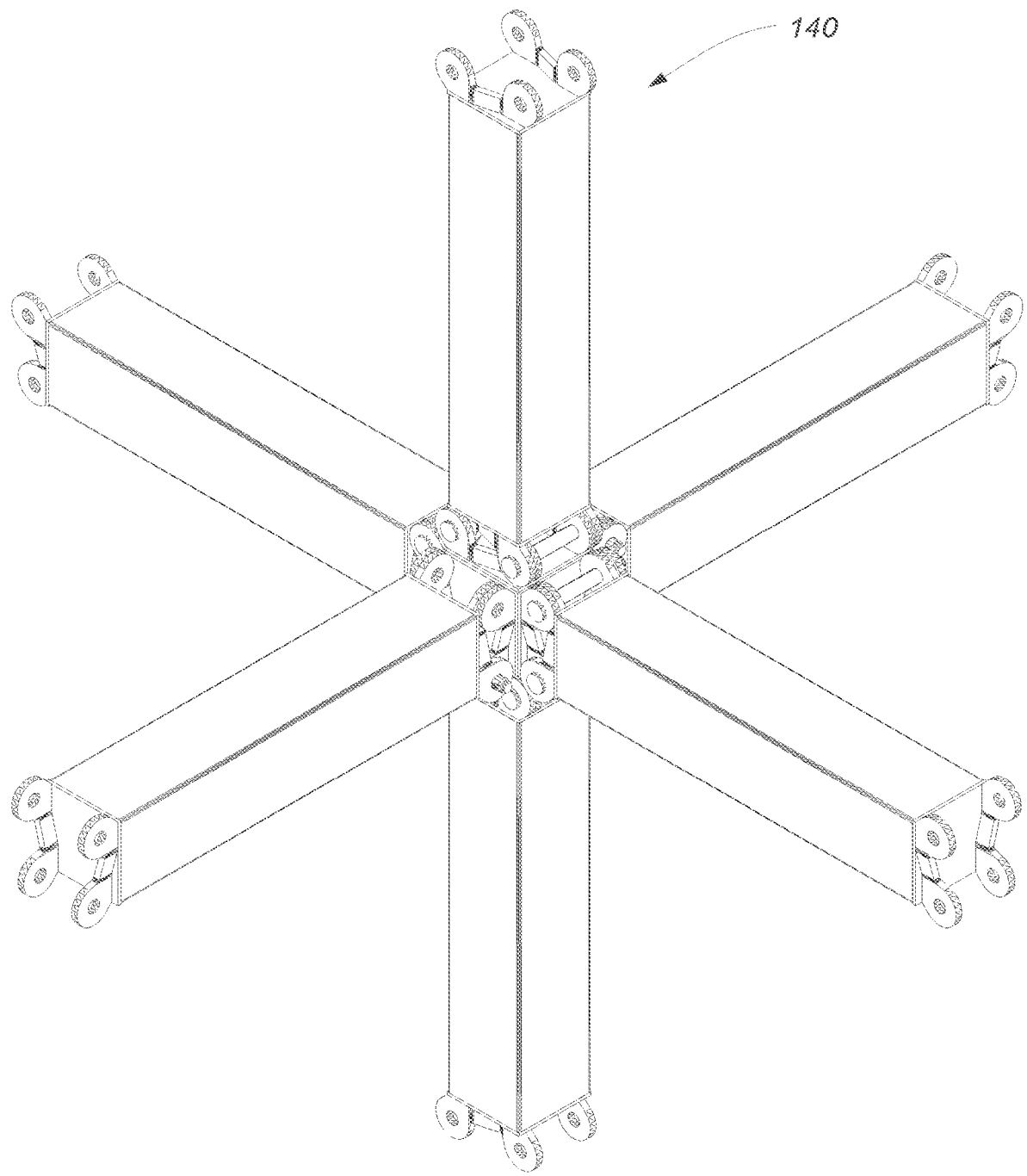
FIG. 7E is another three dimensional depiction of the six-way connector element shown attached to other members in the assembly.

FIG. 7E depicts part of an assembled structure 140 using a six-way connector. In this example, the braces shown in FIGS. 7B-7D are omitted. This drawing illustrates the inner detail through a cut section.

Figure 8A:
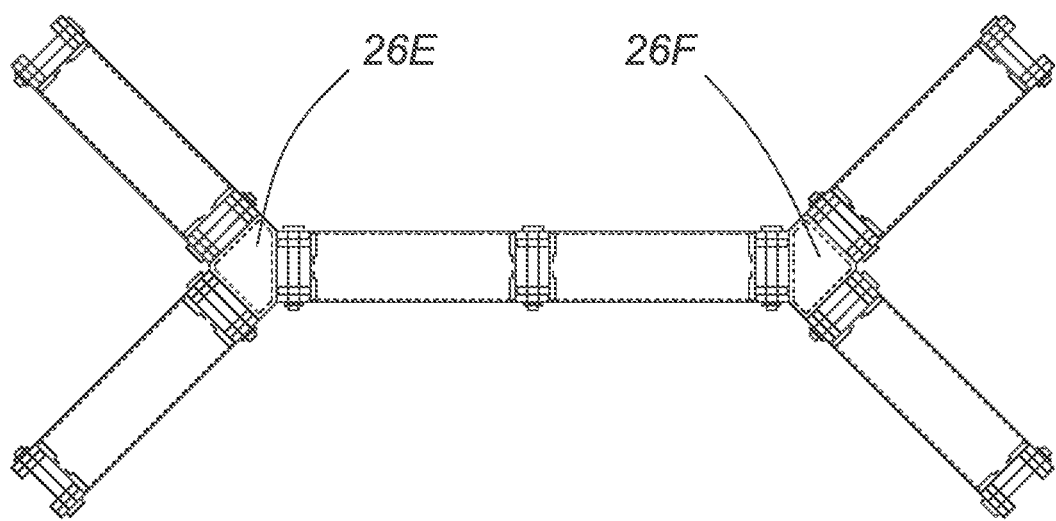
FIG. 8A shows a spreader bar assembly using the three-way connector.
Figure 8B:
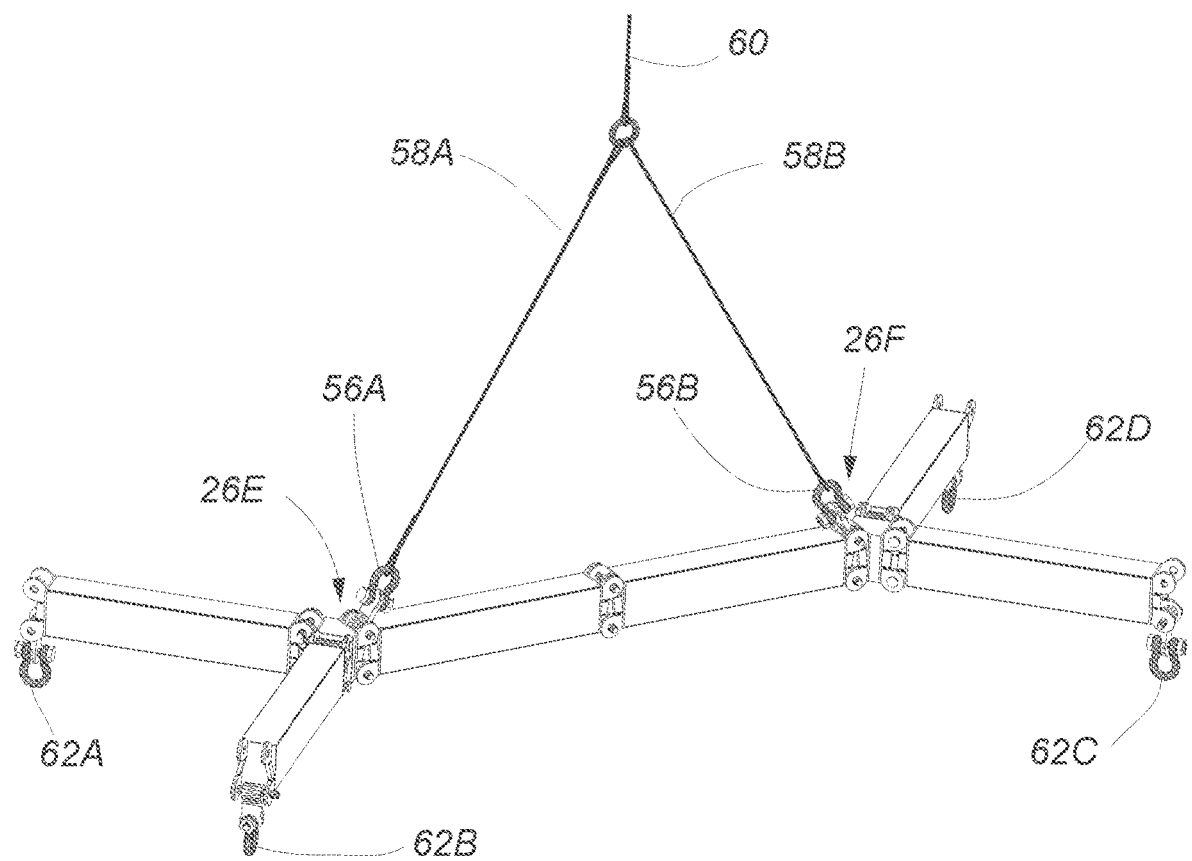
FIG. 8B shows the spreader bar assembly of FIG. 8A lifting a load.
Figure 8C:
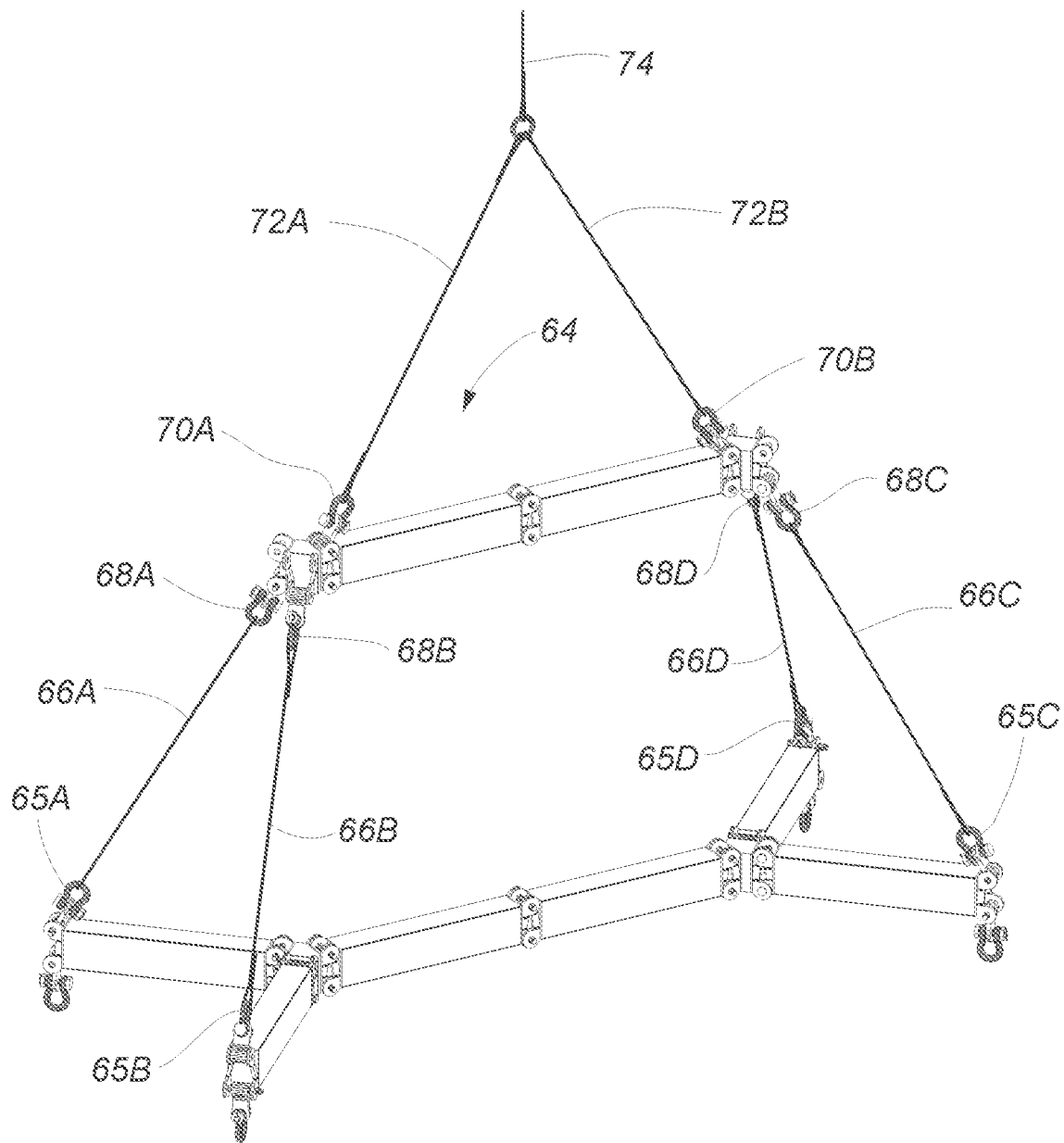
FIG. 8C shows another spreader bar assembly using the three-way connector.
Figure 9A:
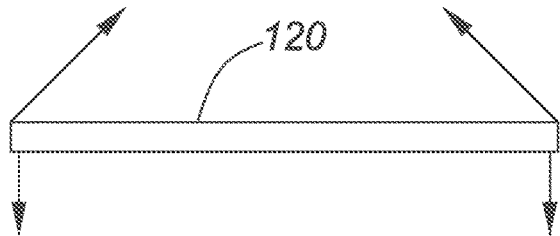
FIG. 9A-9E show various spreader bar assembly configurations encompassed by embodiments.
Figure 9B:
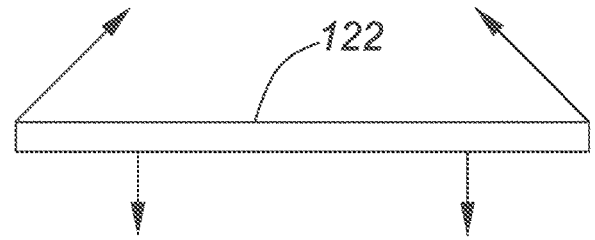
Figure 9C:
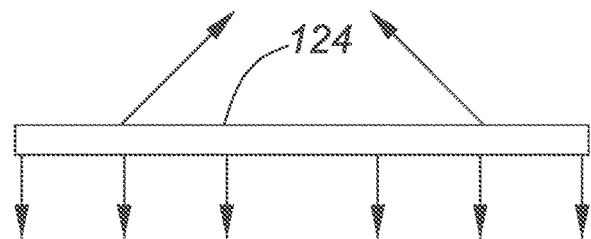
Figure 9D:
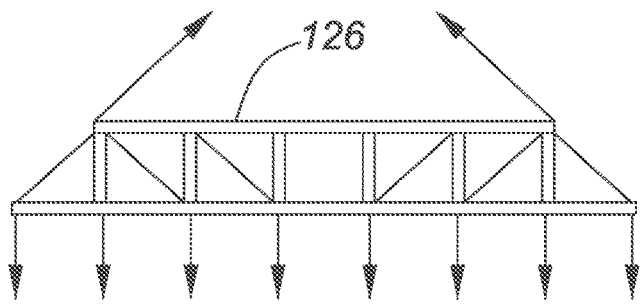
Figure 9E:
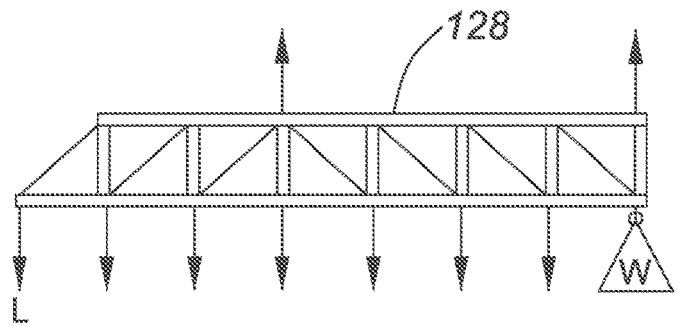

FIGS. 8A, 8B and 8C illustrate the versatility of the spreader bar assembly. As shown, a number of different configurations can be assembled using the components of the spreader bar assembly. FIG. 8A shows an assembled arrangement using two three-way connectors 26E and 26F. The three-way connectors 26E and 26F are the same as described previously in FIG. 4A and thus will not be described further for brevity. Shackles 56A and 56B connect to cables 58A and 58B, respectively. A central cable 60 attaches to a loading device. Shackles 62A, 62B, 62C and 62D attach to a load via cables (not shown). Although shackles are shown in the drawings, it should be appreciated that other means may be used to connect members in the assembly.

FIG. 8C shows yet a further configuration comprising the spreader bar arrangement of FIG. 8B, but with an additional connected spreader bar arrangement 64 comprising two spreader bars attached end-to-end. In this embodiment, shackles 65A, 65B, 65C and 65D link to cables 66A, 66B, 66C and 66D, respectively. Cables 66A, 66B, 66C and 66D link to respective shackles 68A, 68B, 68C and 68D mounted on spreader bar arrangement 64. Shackles 70A and 70B in turn are linked to cables 72A and 72B, respectively. A central cable 74 is attached to a crane.

FIGS. 9A-9E show yet further spreader bar assembly configurations depicted as 120, 122, 124, 126 and 128, further demonstrating the versatility of the components in the assembly.

Thus, it is possible to construct a multitude of different configurations using the components of the spreader bar assembly. Advantageously, the components of the assemblies can be easily assembled and disassembled. In addition, the components can be easily transported, such as in the box of a pick-up truck or possibly the trunk of a car. As noted, drawbacks of some of the known spreader bar assemblies are lack of versatility and difficulties in transport to and from a site. The embodiments disclosed herein address these shortcomings or provide useful alternatives.

Figure 10:
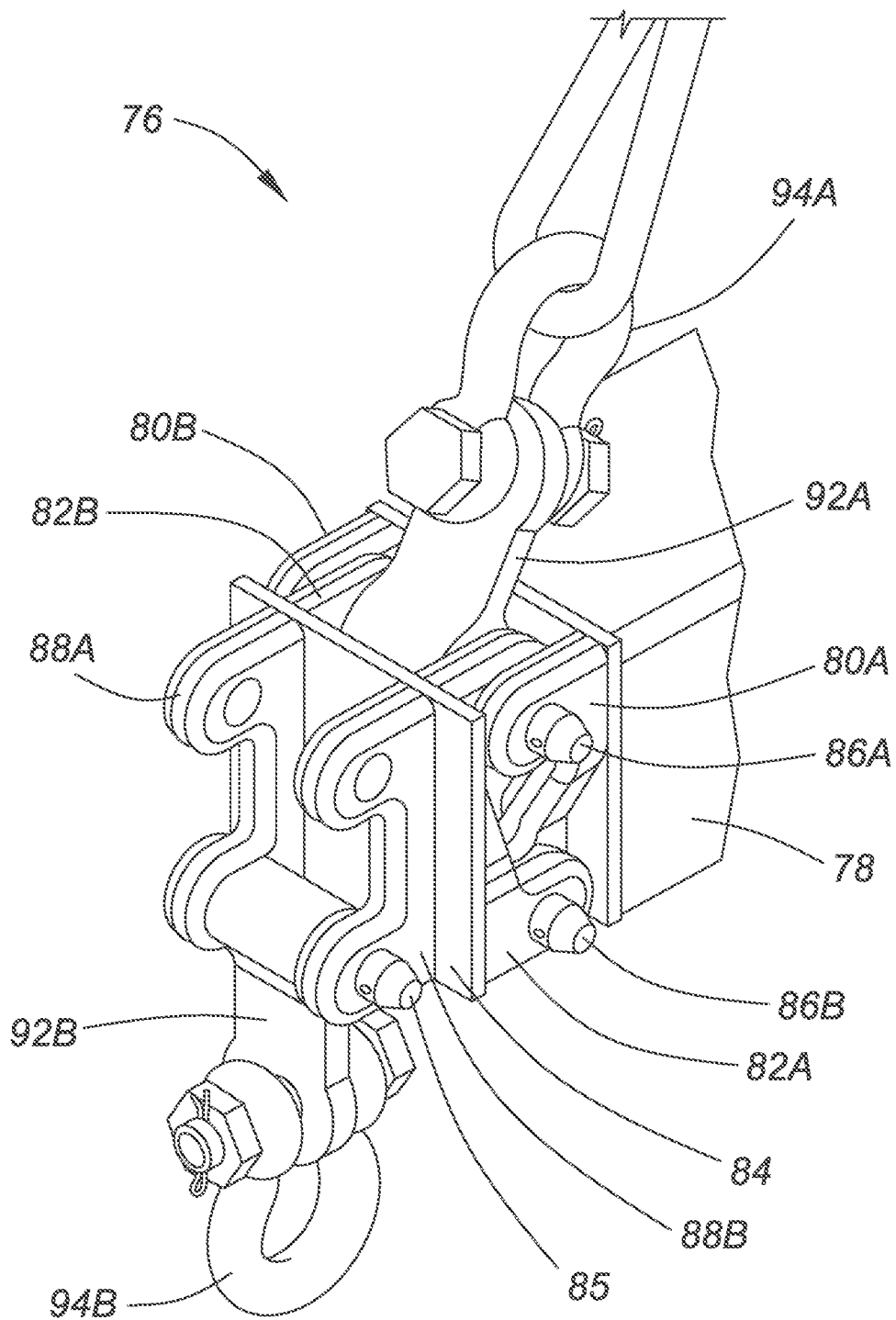
FIG. 10 depicts an extension bracket assembly according to one embodiment.

FIG. 10 depicts an extension bracket assembly 76. The extension bracket assembly 76 is that depicted in the circled regions of FIG. 3A and FIG. 5A. As shown in FIG. 10, the extension bracket assembly 76 is mounted on the end of a spreader bar 78. One end of the spreader bar 78 comprises a pair of connecting members 80A and 80B comprising respective holes formed in lugs through which pins are inserted. The lugs of connecting members 80A and 80B are aligned with a corresponding pair of lugs in connecting members 82A and 82B mounted on one side of a plate 84.

The pins 86A and 86B are inserted through aligned holes in the lugs shown in the drawing. An opposing side of the plate 84 comprises another pair of connecting members 88A and 88B, which each comprise two lugs with holes formed therein. A pin 85 is inserted through the lowermost aligned holes. Shackle brackets 92A and 92B are rotatably mounted on pins 86A and 85, respectively. On shackle brackets 92A and 92B are mounted shackles 94A and 94B, respectively. Shackle bracket 92A and shackle bracket 92B each comprise a hole through which respective shackles 94A and 94B are mounted via pins.

The extension bracket assembly 76 can provide for the possibility of attaching two cables to the terminal ends of the assembly via two shackles, while maintaining the structural stability of the assembly by distributing the load. In some instances, it may be desirable to introduce a small reverse moment in the spreader bar to limit deflections or increase lifting capacity. However, as will be appreciated by those of skill in the art, such extensions can take many forms and the foregoing embodiment is simply illustrative. For example, as shown in FIG. 3B, two shackles can be attached to the terminal end of bar 24M.

While FIGS. 1-10 describe spreader bar assemblies and connectors for use in same, other bar assemblies besides those used for lifting loads can be constructed using the members and connectors described herein.

Figure 11:
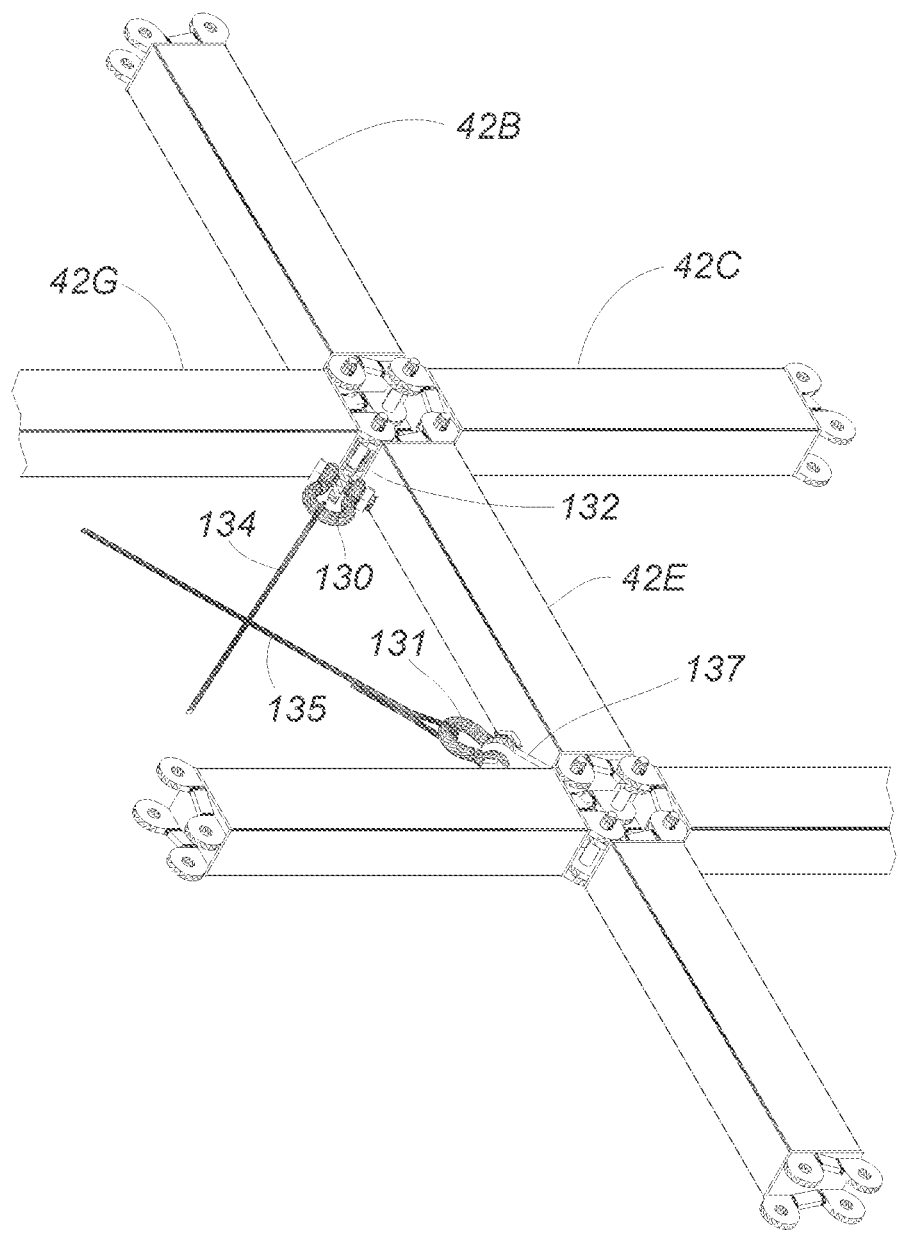
FIG. 11 depicts the use of the connecting members for use in assembling bars that are part of a building structure or other structure that carries or re-distributes load.

For example, FIG. 11 depicts an assembly that can be used in other applications besides a spreader bar assembly, such as in a building frame. The assembly is constructed from the four-way connector depicted in FIG. 6A and FIG. 6B and comprises cables 134 and 135 for increased structural stability. Like reference numbers depict similar or identical parts among the figures. Shackles 130 and 131 are mounted on shackle brackets 132 and 137, respectively. The shackle 130 is connected to a cable 134 and shackle 131 is connected to cable 135.

Figure 12A:
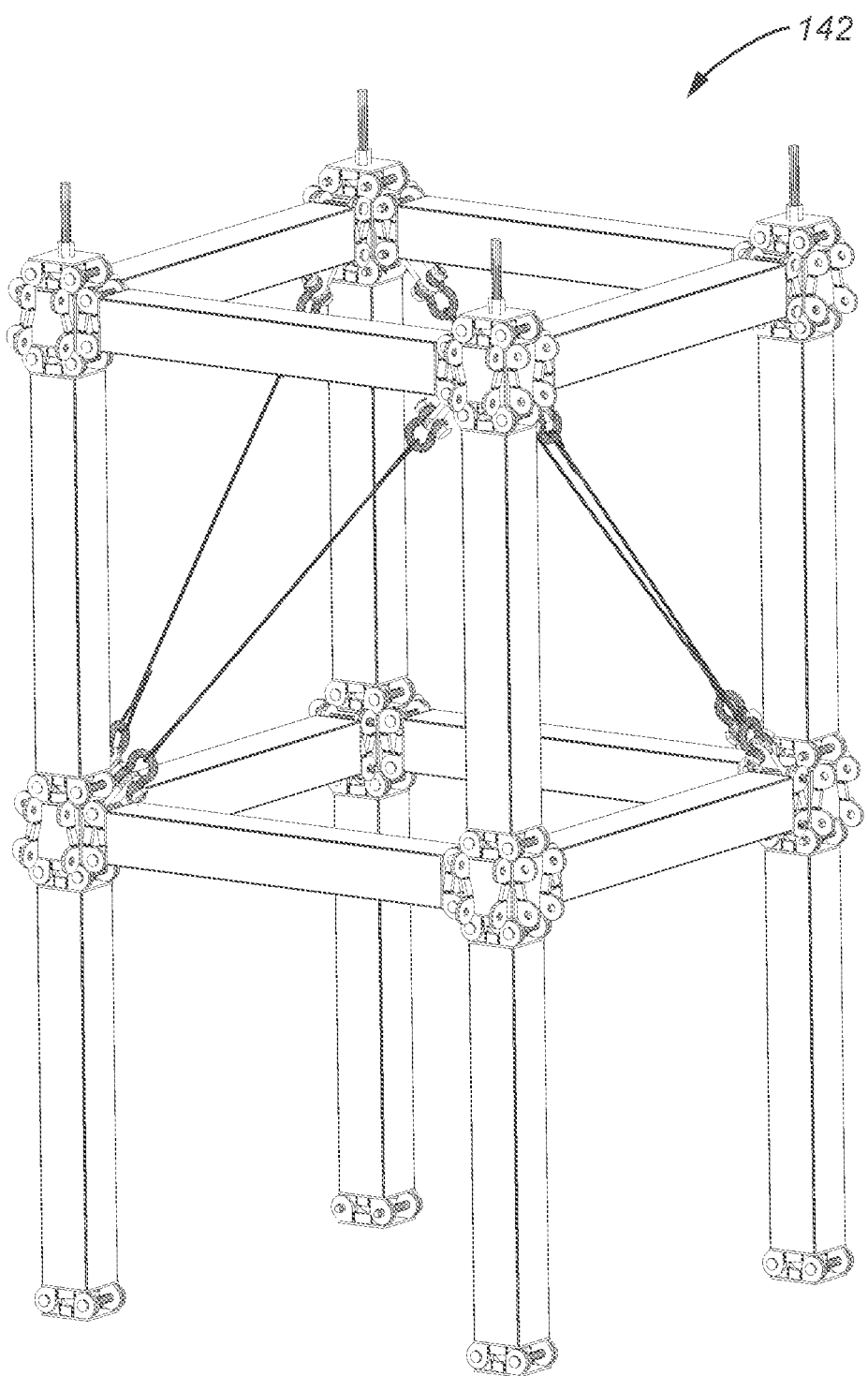
FIG. 12A depicts the use of six-way connectors for use in assembling bars that are part of a building structure or other structure that carries or re-distributes load.
Figure 12B:
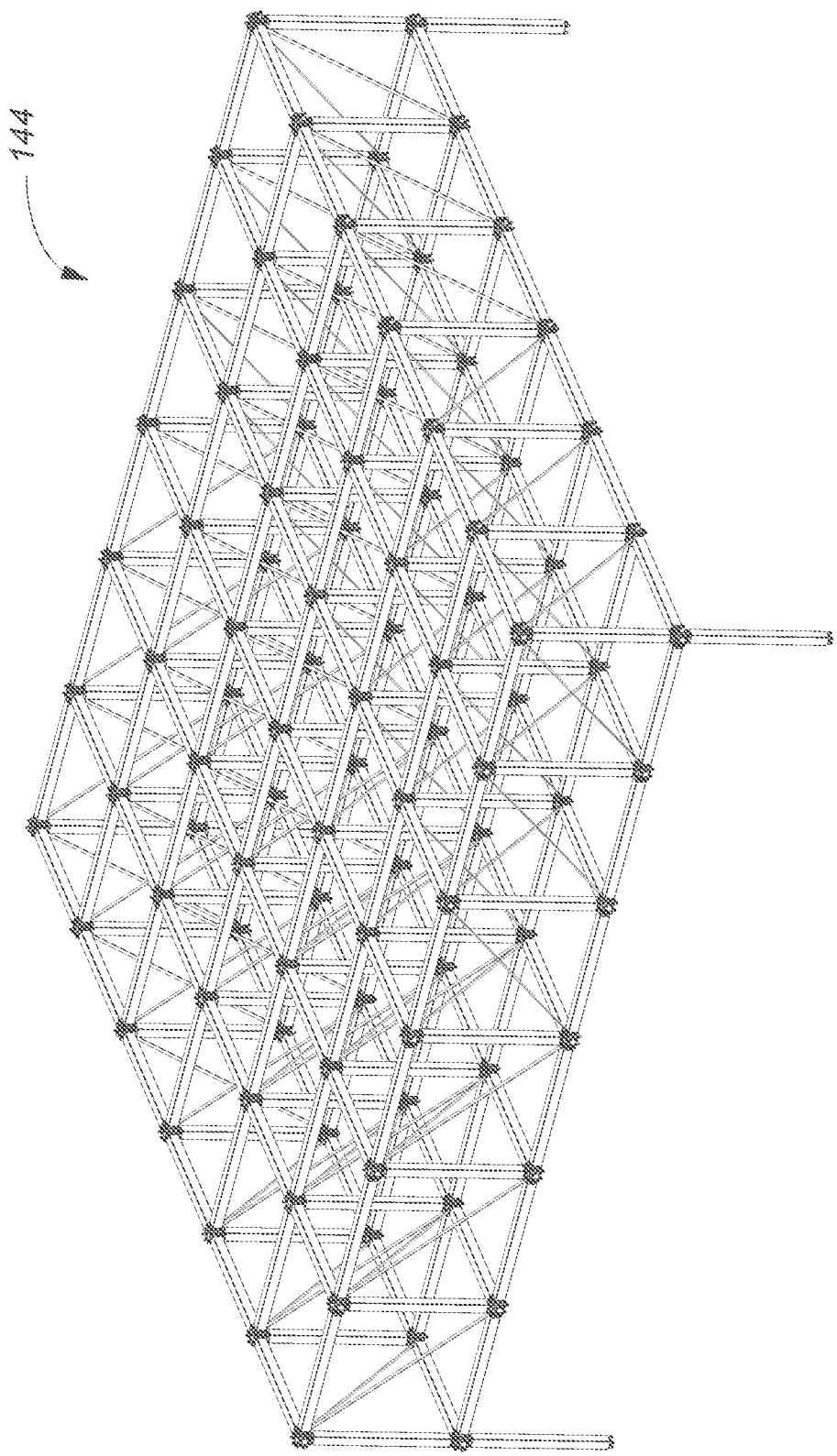
FIG. 12B depicts another example of the use of the connecting members for use in assembling bars that are part of a building structure or other structure that carries or re-distributes load.
Figure 12C:
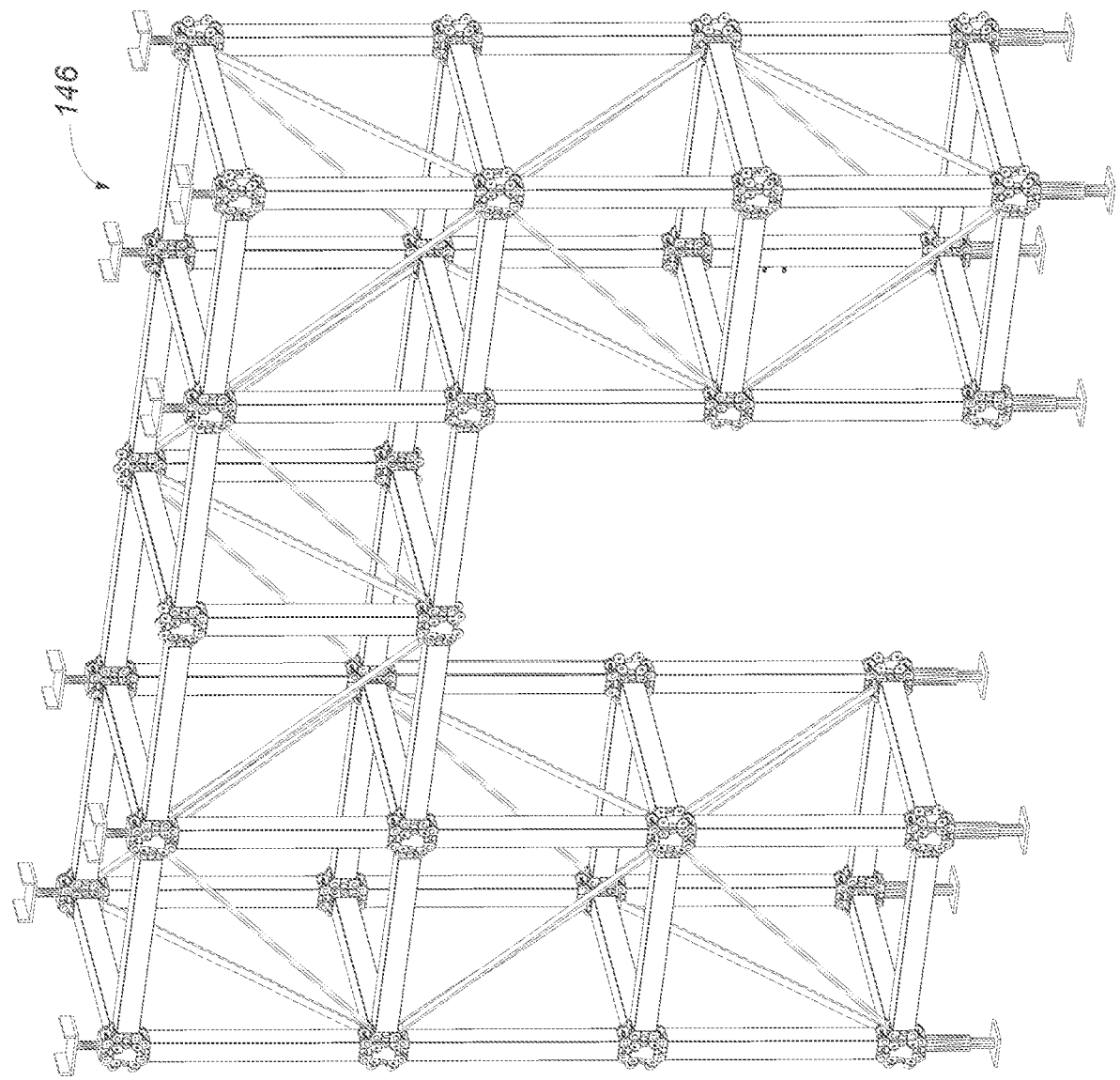
FIG. 12C depicts another example of the use of the connecting members for use in assembling bars that are part of a building structure or other structure that carries or re-distributes load.

FIGS. 12A-12C depict further structures that can be assembled using the six-way connector. FIGS. 12A, 12B and 12C show building structures 142, 144 and 146. Each of these structures comprises braces attached via shackles to the pins of the six-way connectors to enhance structural stability. The six-way connector was previously described in FIG. 7A.

Figure 13A:
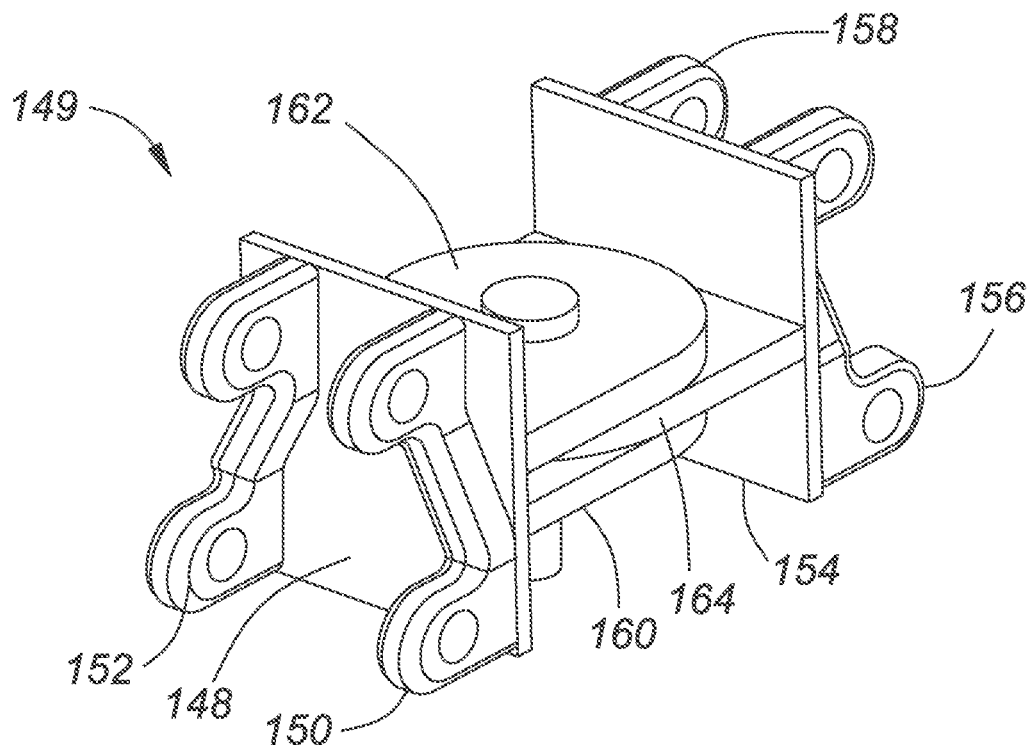
FIG. 13A shows a two-way connector according to an embodiment.

FIG. 13A shows a two-way connector 149 having a first plate 148 with connecting members 150 and 152 each comprising a pair of lugs and a second plate 154 with connecting members 156 and 158 each comprising a pair of lugs. The central portion of the two-way connector 149 comprises a pair of tongues 160, 162 that are fitted on an opposing tongue 164 disposed on plate 154. The pair of tongues 160, 162 and the opposing tongue 164 comprise holes through which a pin is inserted when they are aligned.

Figure 13B:
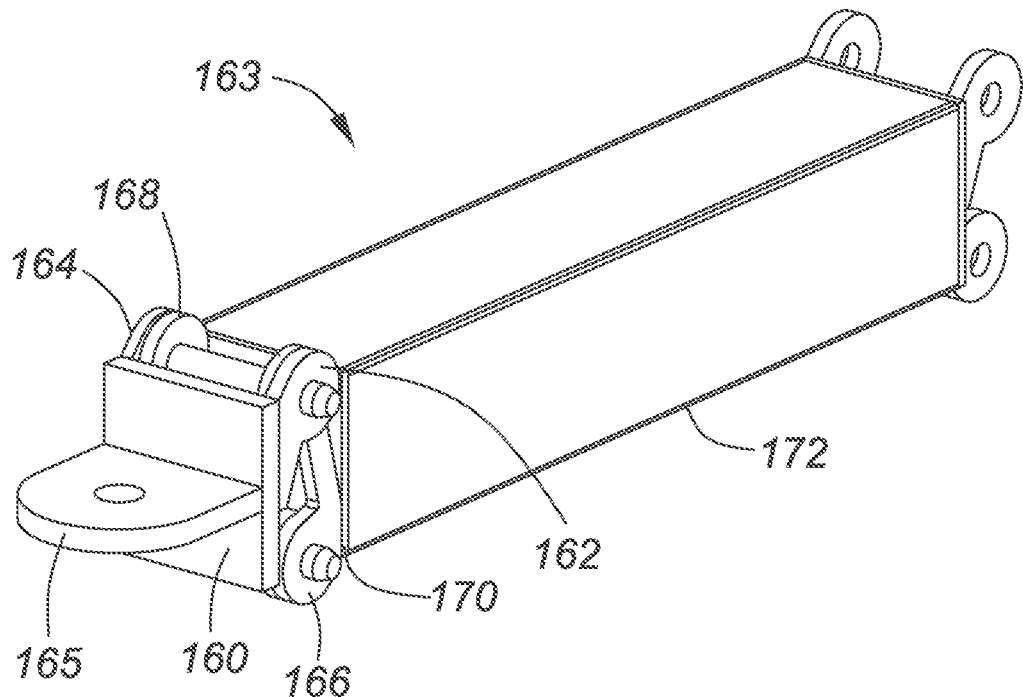
FIG. 13B shows a two-way connector according to another embodiment.

FIG. 13B depicts an alternate member 163 for use in an assembly comprising a plate 160 having on one side a tongue 165 with a hole formed therein and, on the other side, a pair of connecting members 162, 164 each comprising a pair of lugs. The connecting members 162, 164 are attached by pins to a corresponding pair of connecting members 166, 168 comprising lugs on a second plate 170 to which a bar 172 is connected. The tongue 165 can be secured to a building or other structure via a pin or other fastener that fits through the hole formed in the tongue. Assembly 163 could be used as a crane tie down or as part of a building structure. As will be appreciated by those of skill in the art, tongues 160, 162 and 164 can take several forms and thus are simply illustrative of non-limiting embodiments.

Figure 13C:
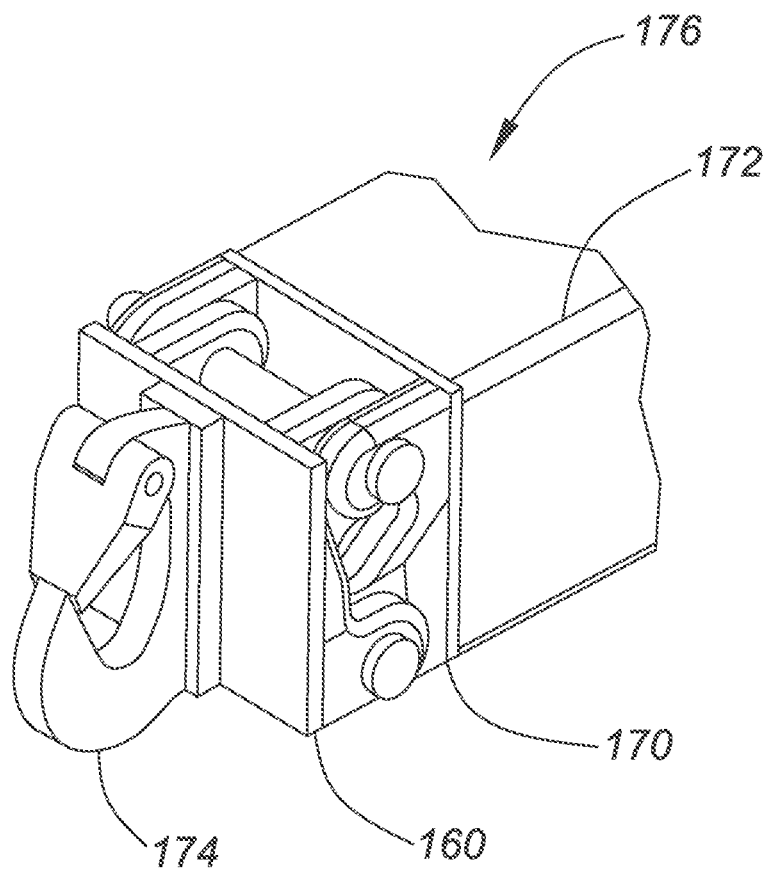
FIG. 13C shows a two-way connector according to further embodiment.

FIG. 13C depicts an assembly 176 that is similar to the one depicted in FIG. 13B, except a clamp 174 replaces the tongue 165. Some of the reference numbers are omitted for brevity. Otherwise, identical reference numbers are used in FIGS. 13B and 13C.

Figure 14A:
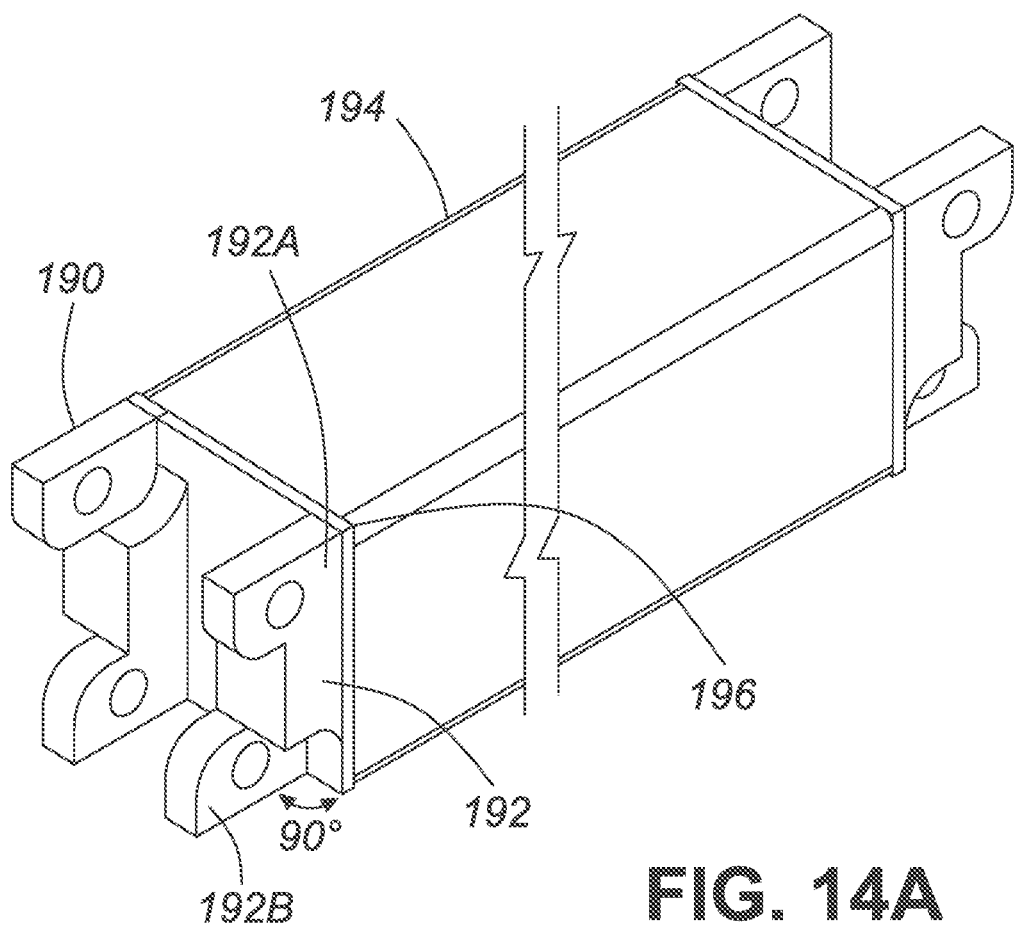
FIG. 14A shows connecting members having lugs of blocked configuration in unassembled form.

FIG. 14A depicts an embodiment having a connecting member with a lug design that differs from that described in FIGS. 1-13, but its operation is based on a similar principle. In the embodiments described previously in FIGS. 1-13, the top and bottom lugs formed on a connecting member at the end of each bar or connector were horizontally offset (for example, by a distance "d" shown in FIG. 2A). As discussed, such an off-set orientation facilitates complementary interconnection with a corresponding pair of lugs on another connecting member as described previously.

In the embodiment described in FIG. 14A, each lug is of a blocked configuration. This is shown more clearly with reference to lug 192. The blocks 192A and 192B forming the lug 192 are off-set from one another. An example of an angle of off-set, shown as A in the drawing, is 10-20 degrees with respect to the upper corner 196 of the bar 194 to which the lug is mounted. Similar to the previously described embodiment, such an off-set orientation of the two lugs on bar 194 facilitates complementary interconnection with corresponding lugs on another spreader bar.

Figure 14B:
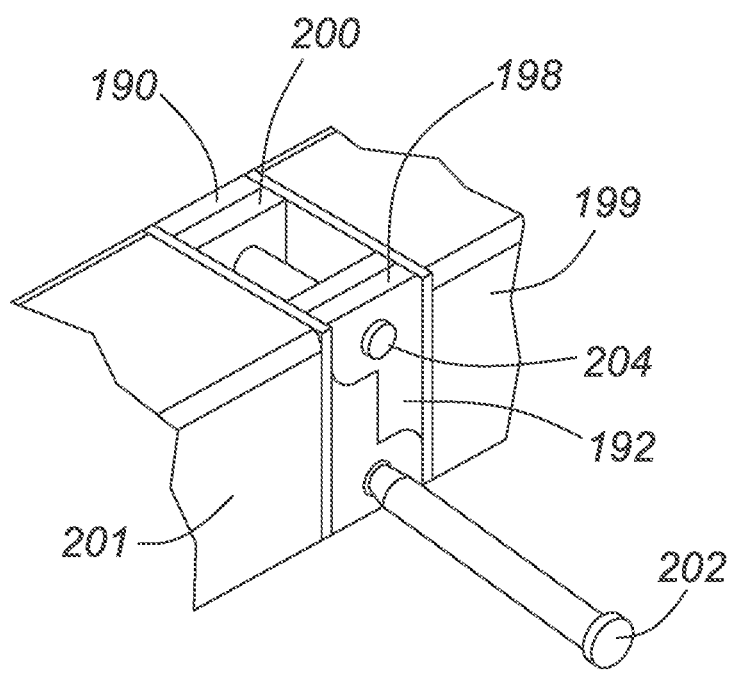
FIG. 14B shows the connecting members having lugs of blocked configuration in assembled form.

FIG. 14B shows the blocked connecting members 190 and 192 on a first bar 199 connected to a complementary pair of blocked connecting members 198 and 200 disposed on a second bar 201. When the connecting members 190 and 192 are aligned for connection with corresponding connecting members 198 and 200, they are oriented in opposite configurations as shown in FIG. 14B. Such an orientation allows the lugs of the connecting members to interconnect with one another in a staggered configuration after pins 202 and 204 are inserted through aligned holes at each end of the lugs.

Figure 15A:
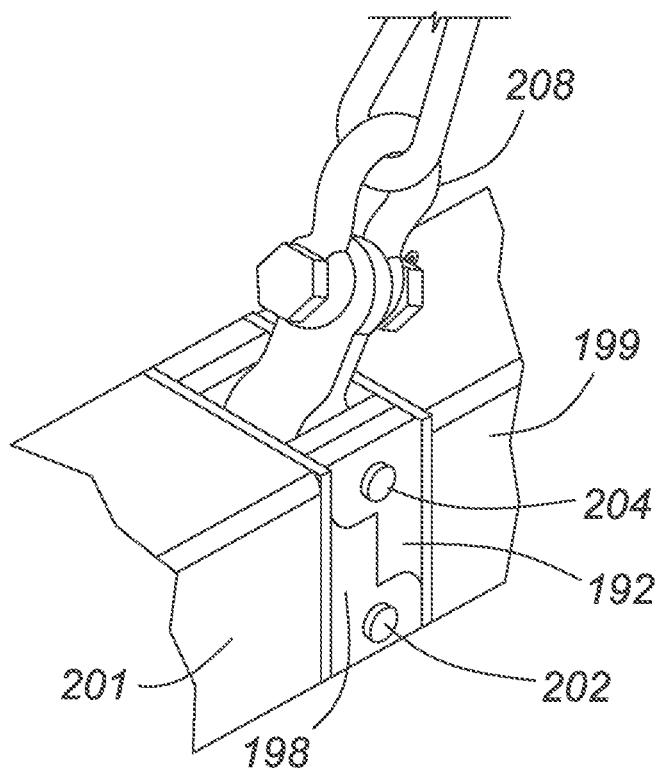
FIG. 15A shows the connecting members having lugs of blocked configuration with a lifting element attached thereto.
Figure 15B:
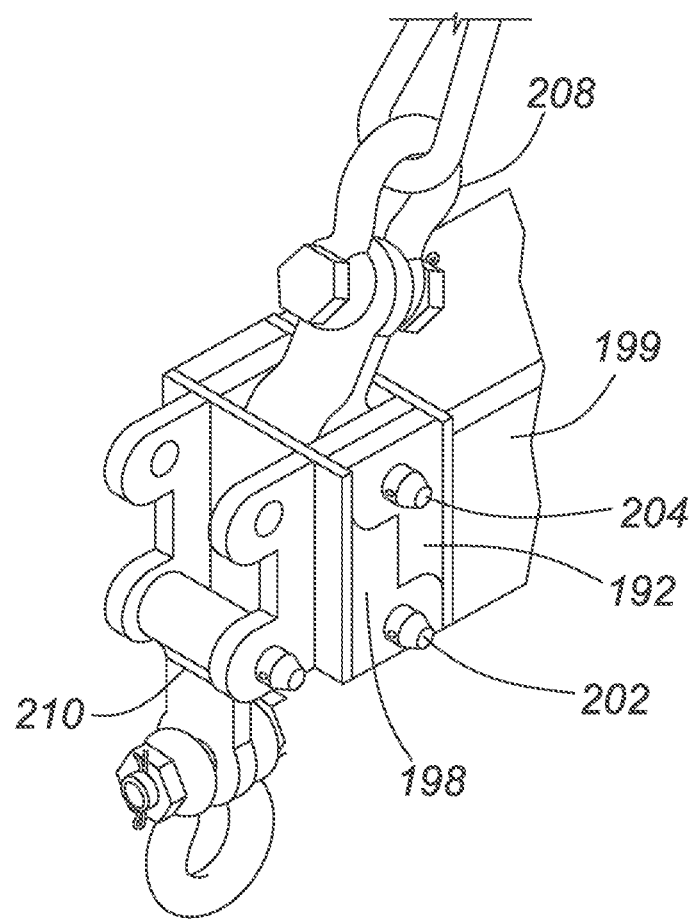
FIG. 15B shows the connecting members having lugs of blocked configuration with a lifting element in the form of a shackle bracket assembly attached thereto.
Figure 16A:
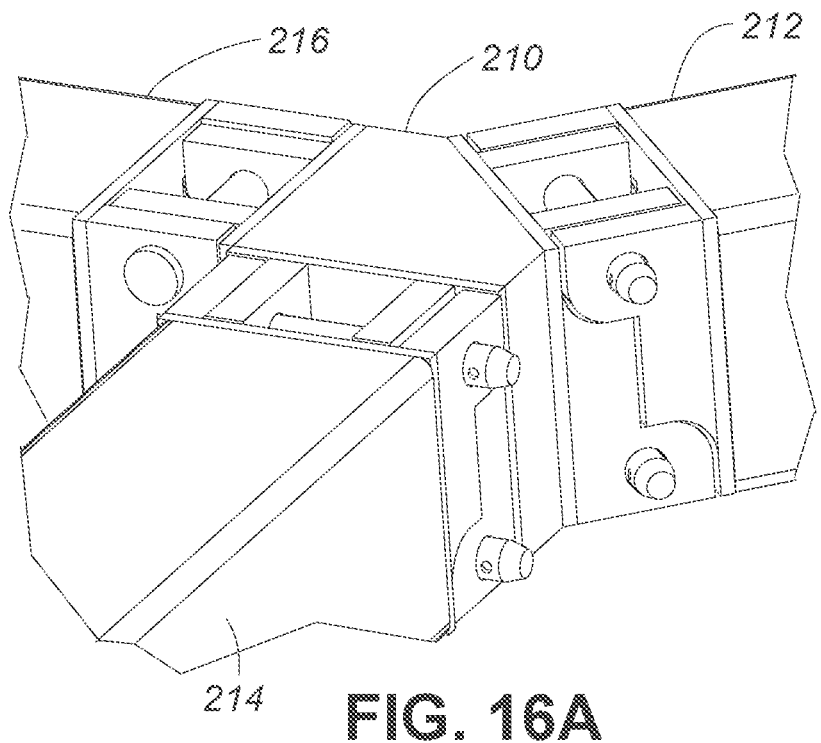
FIG. 16A shows a three-way connector with blocked lugs.
Figure 16B:
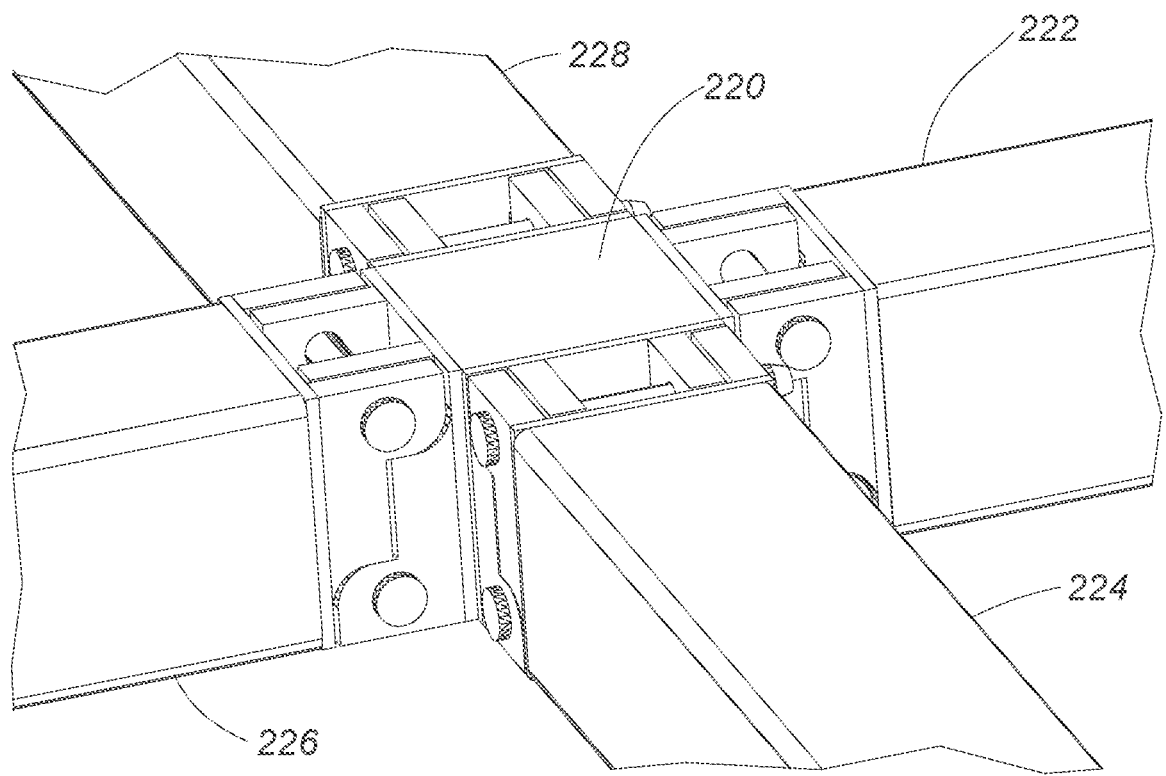
FIG. 16B shows a four-way connector with blocked lugs.
Figure 16C:
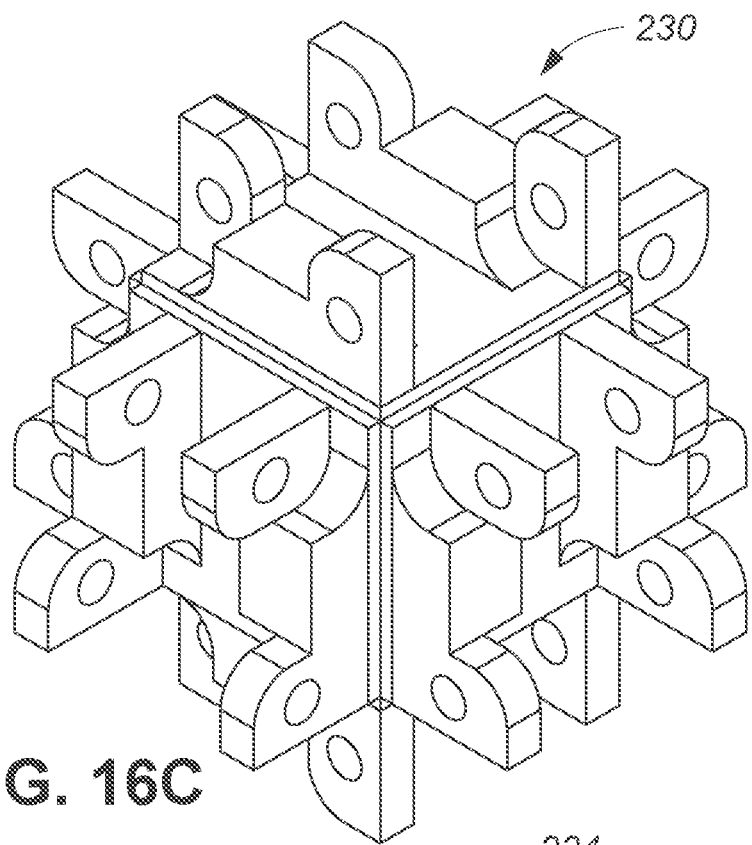
FIG. 16C shows a six-way connector with blocked lugs.
Figure 17:
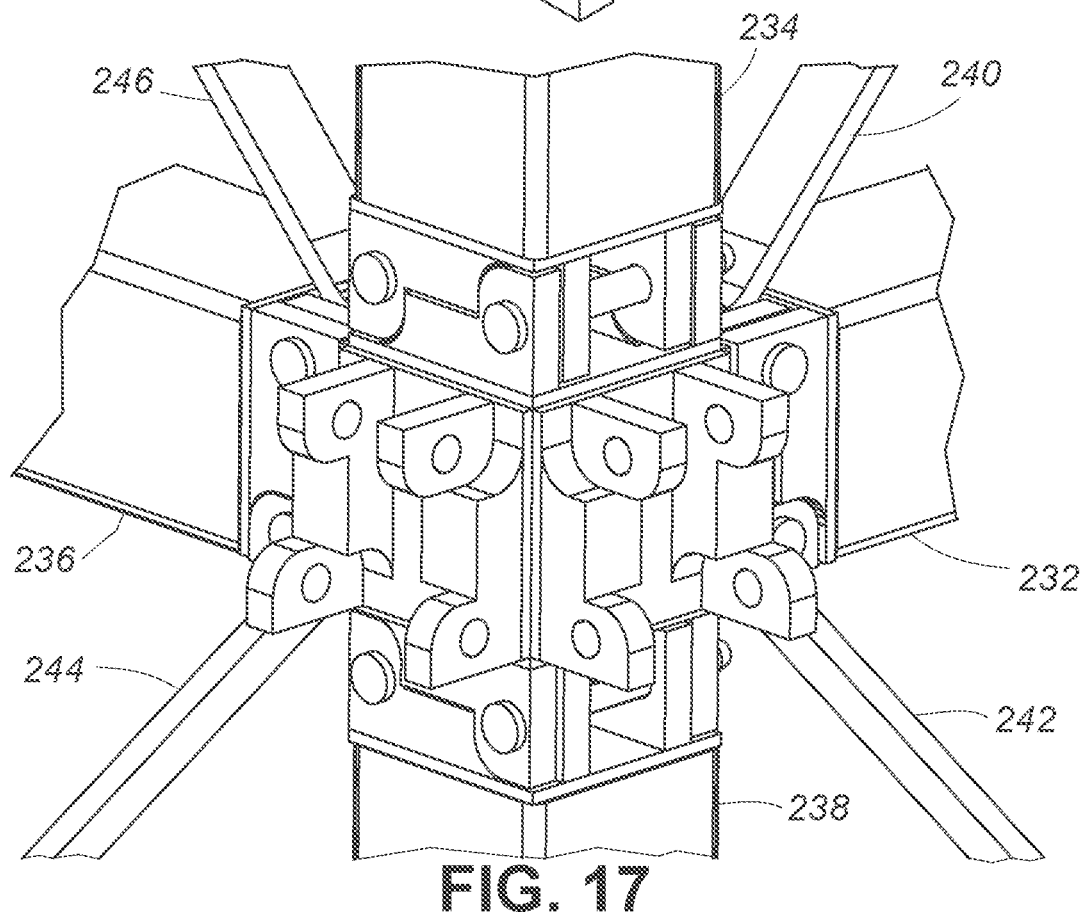
FIG. 17 shows a six-way connector with blocked lugs in assembled form.

FIG. 15A shows interconnected connecting members 192 and 198 similar to FIG. 14B. A shackle 208 can be connected to pin 204 via a shackle bracket as previously described. FIG. 15B depicts a similar arrangement, but with a shackle bracket assembly 210 replacing the bar 201 of FIG. 15A. The arrangement shown in FIG. 15B is similar to the extension bracket assembly of FIG. 10, but the connecting members have a blocked configuration. FIG. 16A shows a three-way connector 210 utilizing blocked connecting members having lugs, but is otherwise similar to that described previously with respect to the angled lugs. The three-way connector 210 connects bars 212, 214 and 216. A four-way connector 220 is depicted in FIG. 16B and connects bars 222, 224, 226 and 228. FIG. 16C shows a six-way connector 230 with blocked lugs and FIG. 17 shows the six-way connector with blocked lugs 230 attached to bars 232, 234, 236 and 238, similar to the assembly depicted in FIG. 7B. Braces 240, 242, 244 and 246 are rotatably mounted to pins (obstructed in drawing). The braces 240, 242, 244 and 246 have a rotation limit of around 120-140 degrees, which as described previously in relation to FIG. 7D, can increase carrying capacity and shear capacity of the joint.

Figure 18A:
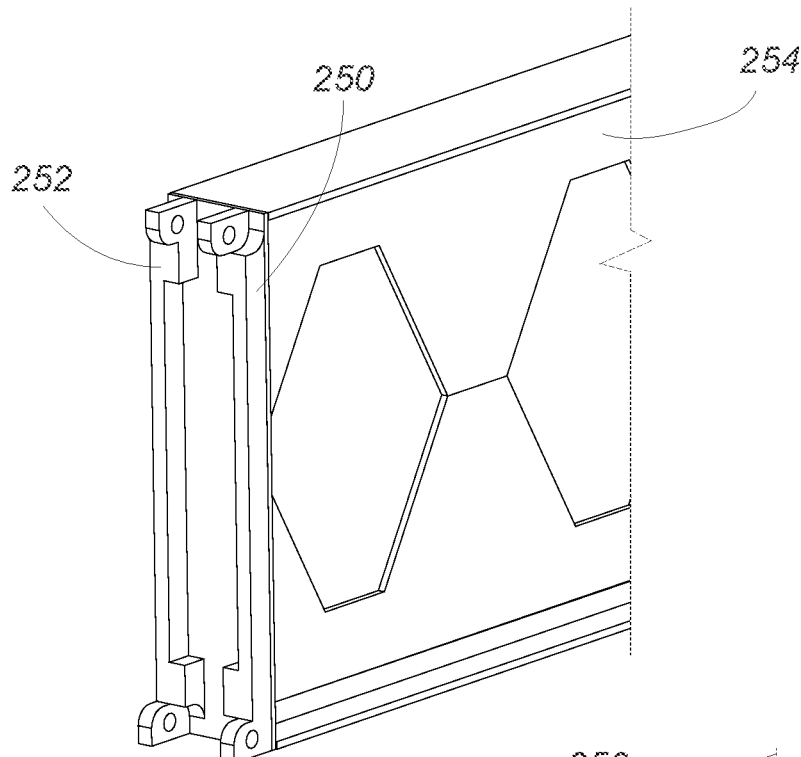
FIG. 18A shows a pair of connecting members that are blocked and elongate.
Figure 18B:
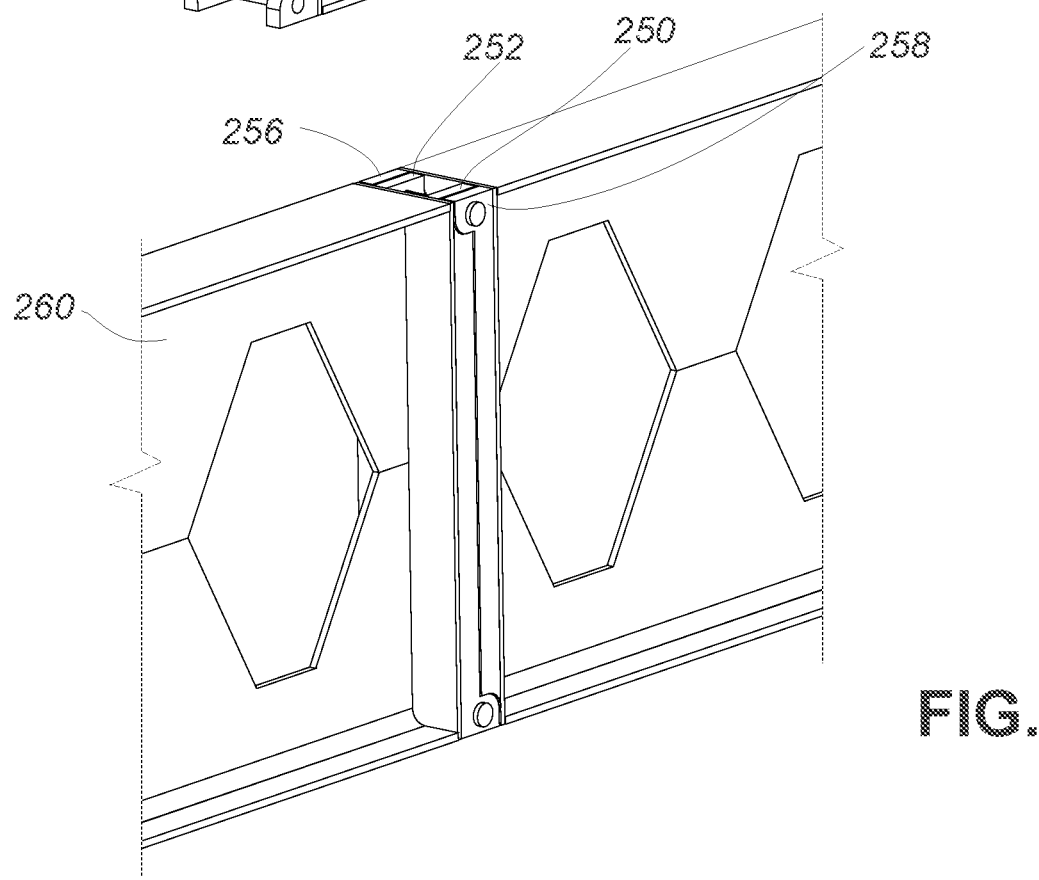
FIG. 18B shows a pair of connecting members that are blocked and elongate in assembled form.
Figure 20A:
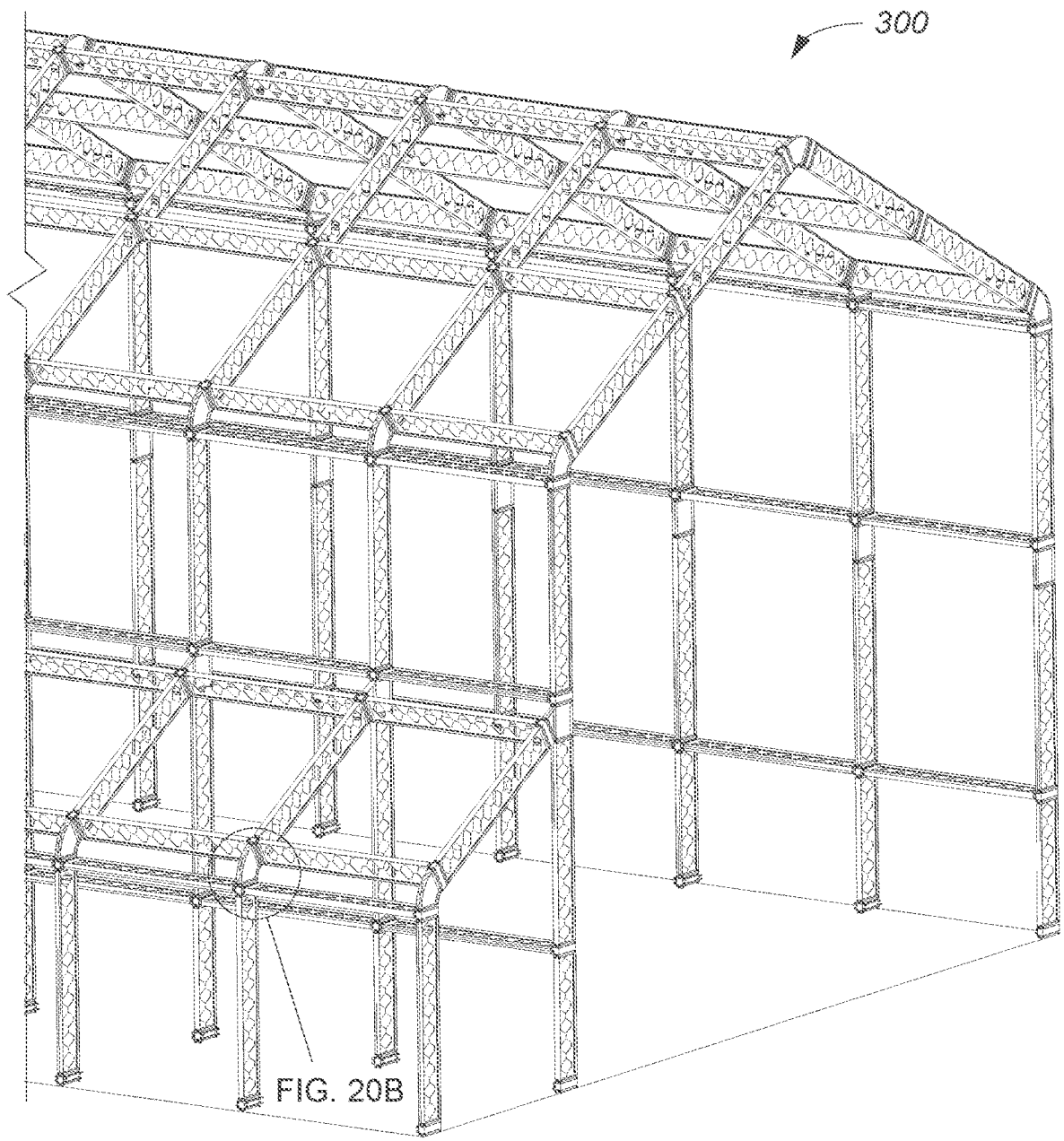
FIG. 20A shows an assembled frame for a light industrial building utilizing plates comprising the connecting members.

FIG. 18A shows a pair of blocked connecting members 250 and 252 attached to one end of a plate 254 that forms part of a frame in a building structure as shown in FIG. 20A. The connecting members 250 and 252 are similar in construction to blocked connecting members 190 and 192 shown in FIG. 14A, but in this embodiment are elongated lengthwise. The elongated, blocked connecting members 250 and 252 attach to corresponding blocked, elongated connecting members 256 and 258 formed on plate 260.

Figure 19A:
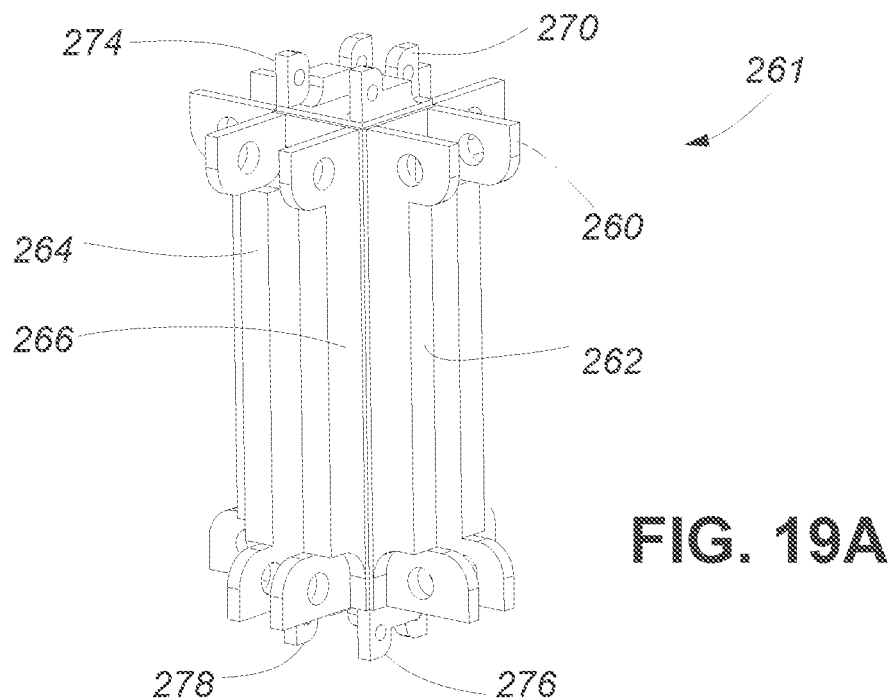
FIG. 19A shows a six-way connector element comprising connecting members that are blocked and elongate.
Figure 19B:
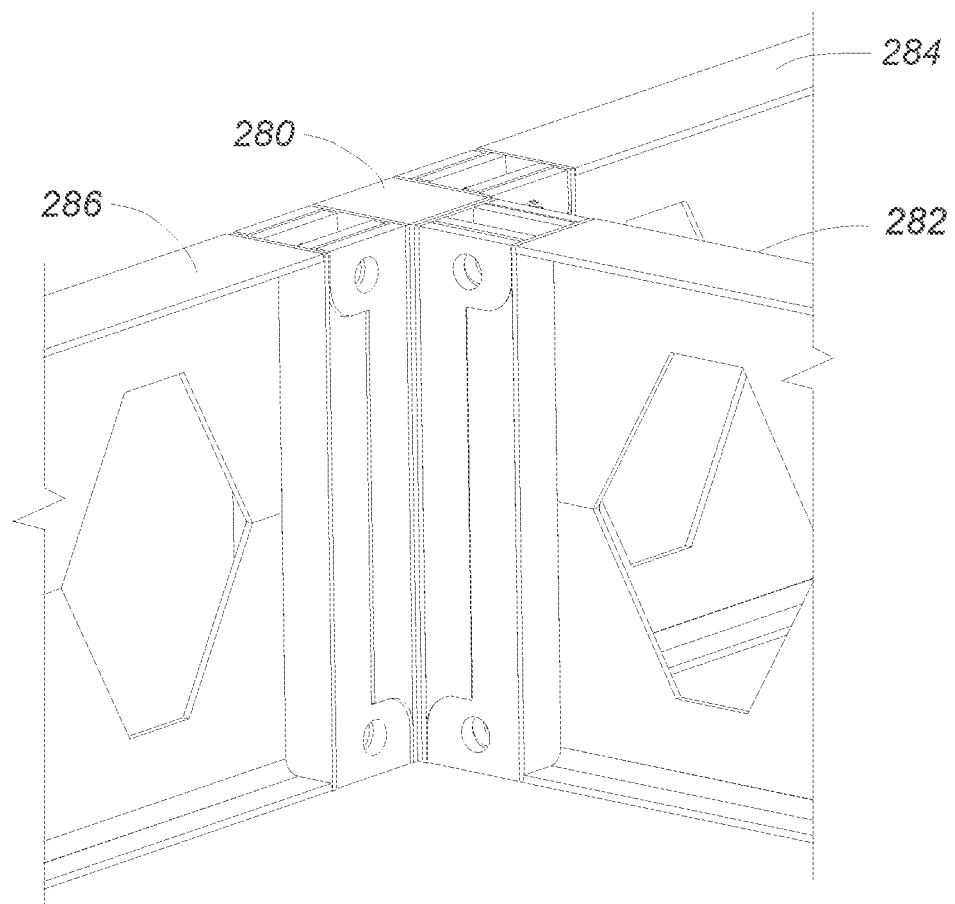
FIG. 19B shows a connector having blocked and elongate connecting members on three faces thereof.

FIG. 19A shows a six-way connector 261 having a pair of blocked, elongated connecting members on four faces of the six-way connector. The top and bottom faces of the six-way connector (in the orientation shown) have shorter pairs of blocked connecting members 270, 274, 276, 278, similar to those shown in the embodiment of FIG. 14A. FIG. 19B shows a three-way connector having elongated, blocked connecting members on lateral faces thereof that connect to complementary connecting members formed on plates 282, 284, 286.

Figure 20B:
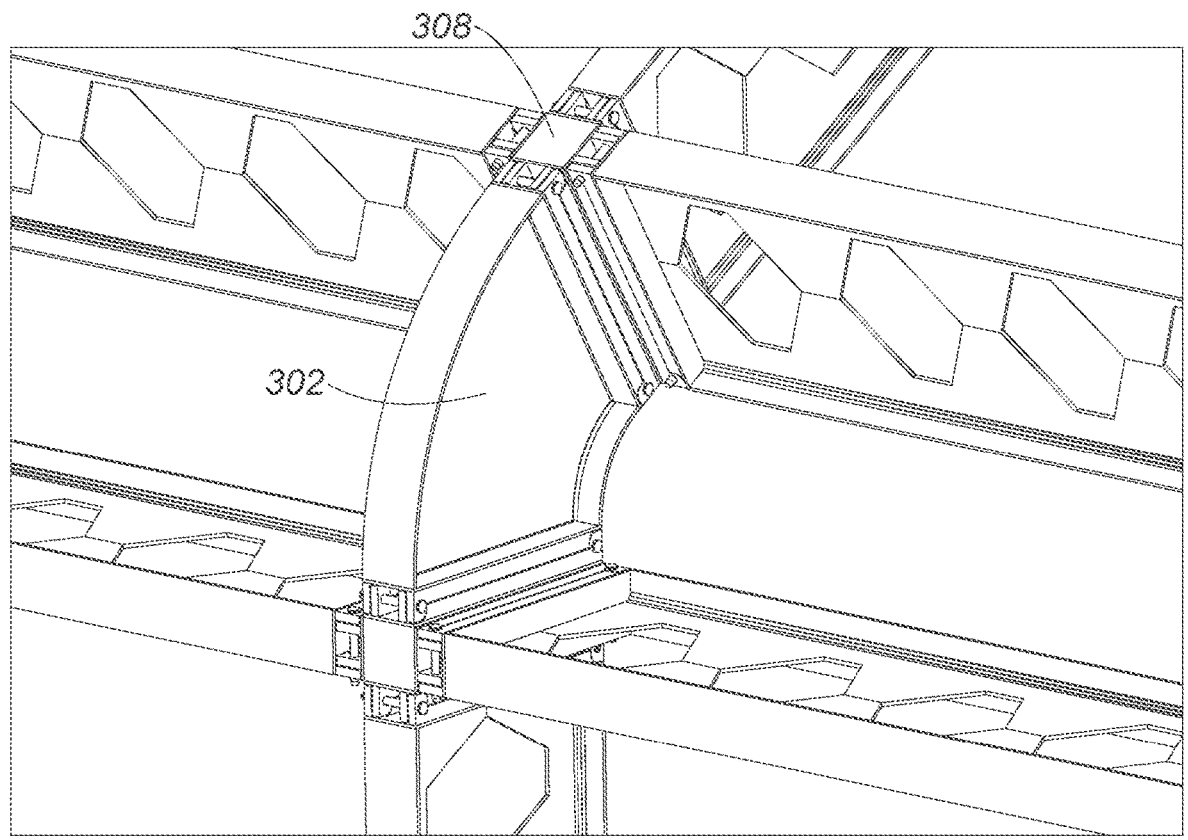
FIG. 20B is a detailed view of the circled region of FIG. 20A.
Figure 20C:
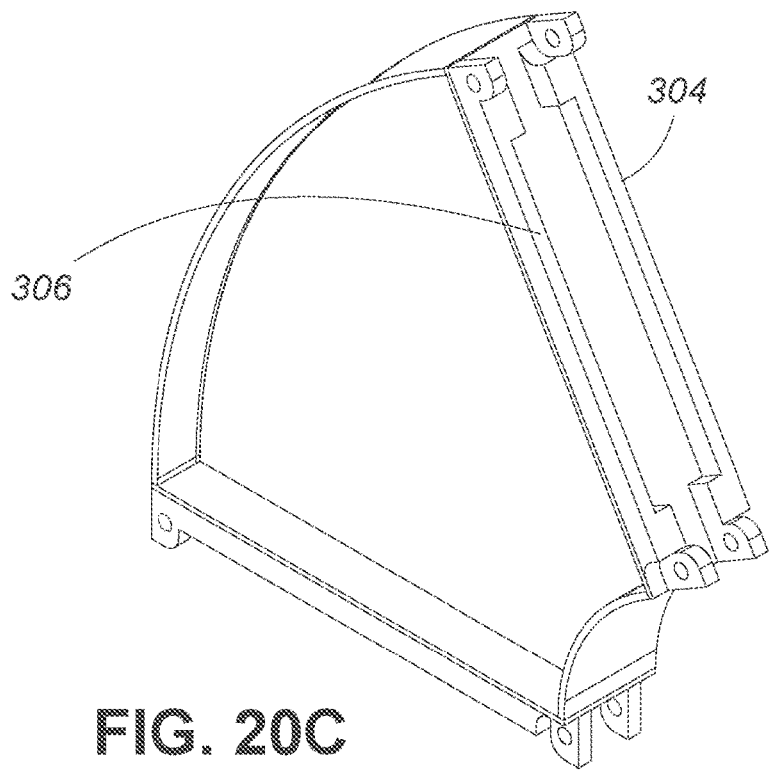
FIG. 20C shows a plate depicted in FIG. 20B.

FIG. 20A shows an assembled frame 300 for a light industrial building utilizing the plates comprising blocked, elongate connecting members as shown in FIGS. 18A, 18B, 19A and 19B. FIG. 20B is a detailed view of the circled region of FIG. 20A. In FIG. 20A, a wedge-shaped plate 302 is shown that forms part of the assembled frame 300. As shown in FIG. 20C, the wedge-shaped plate 302 having a pair of elongate, blocked connecting members 304 and 306 that each connect with a corresponding pair of blocked connecting members in the four-way connector 308 shown in FIG. 20B.

Figure 21:
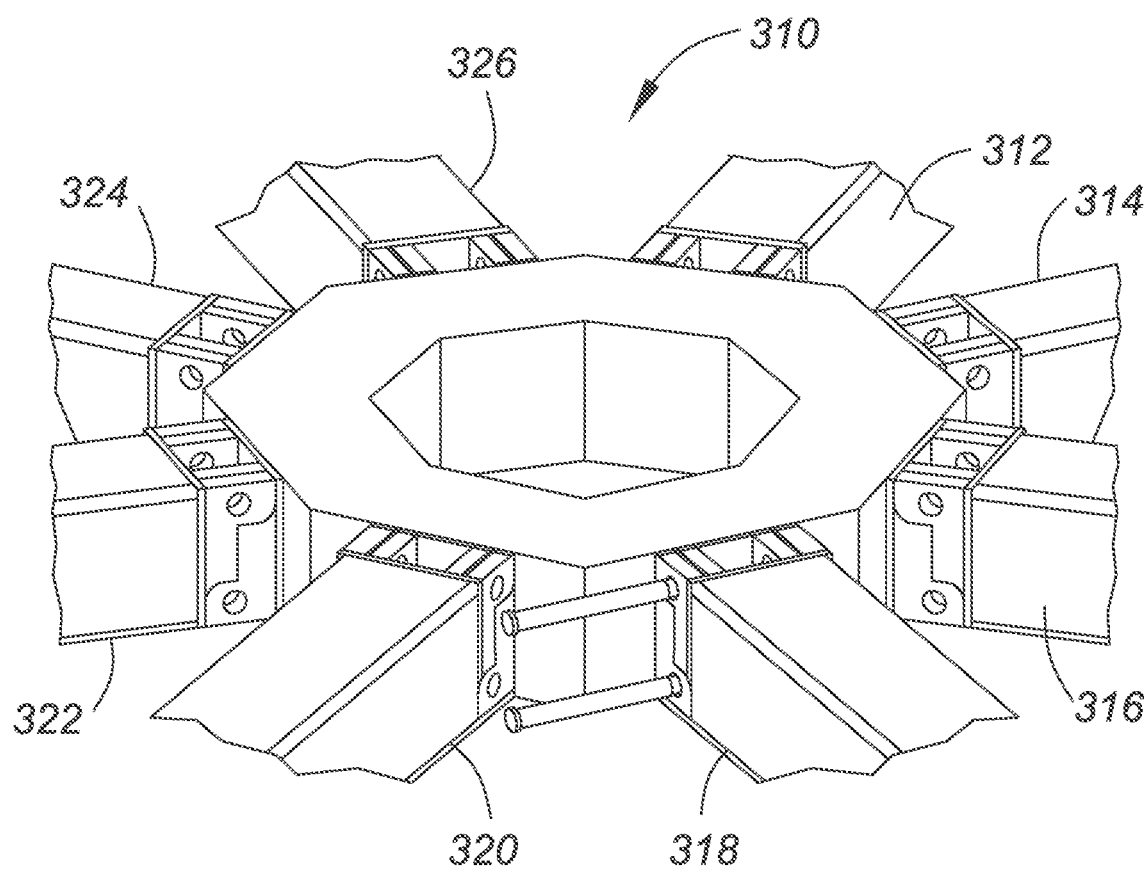
FIG. 21 shows an eight-way connector according to embodiments.

FIG. 21 shows an eight-way connector 310 comprising a pair of blocked connecting members on each outwardly facing face that connect to corresponding pairs of connecting members on eight bars 312, 314, 316, 318, 320, 322, 324 and 326 as shown.

The embodiments described above should not be construed to limit the scope of the invention. The skilled artisan readily recognizes that many other embodiments are encompassed by the invention.

The invention claimed is:

1. An assembly for use with a spreader bar arrangement, a crane, or as part of a frame for a building structure, comprising:
   a plurality of members connectable in an assembled arrangement for supporting, carrying or distributing a load;
   each member comprising two ends, each end having two connecting members, each connecting member consisting essentially of two lugs, each lug having a hole therethrough; a first pair of the lugs of the connecting members are located at opposing edges of the end of the member and a second pair of the lugs of the connecting members are vertically spaced from the first pair with each lug in the second pair being horizontally offset from the respective opposing edge of the end of the member, the first and second pair of lugs are each symmetrically arranged about a centerline of the end of the member; and the first pair of lugs and the second pair of lugs are spaced at a different distance from the centerline of the end of the member;
   which pair of connecting members are configured for interconnection when inverted 180 degrees about a longitudinal axis of the pair of connecting members with a corresponding pair of identically arranged connecting members formed on another member in said assembly for connection thereto; and
   fasteners that each comprise a shaft that extend through the holes formed in said lugs when the holes in the lugs of each pair of connecting members are aligned with the holes in the lugs of the corresponding pair of connecting members on the other member.

2. The assembly of claim 1, wherein the fasteners are pins that comprise a head at a first end and a releasable connecting element at a second end.

3. The assembly of claim 1, further comprising lifting members for lifting a load when said assembly is assembled.

4. The assembly of claim 3, wherein the lifting members are rotatably connectable to a respective shaft of one of the members.

5. The assembly of claim 1, wherein the members are spreader bars.

6. The assembly of claim 1, wherein members positioned at distal ends in said assembly when assembled comprise respective extension bracket assemblies that comprise rotatably mounted shackle brackets for connection to respective shackles that are each connectable to a support member.

7. The assembly of claim 6, wherein the support member is a cable or a brace.

8. The assembly of claim 6, wherein each extension bracket assembly comprises two rotatably mounted shackle brackets.

9. The assembly of claim 8, wherein the two rotatably mounted shackle brackets are disposed on opposite sides of the extension bracket assembly.

10. The assembly of claim 1, wherein the assembly comprises one or more cables or braces to increase structural support or distribute load when assembled.

11. The assembly of claim 10, wherein the one or more cables or braces have a rotation limit defined by two adjacent members in the assembly when assembled.

12. The assembly of claim 1, wherein the assembly is a frame for a building when assembled.

13. The assembly of claim 1, wherein the assembly is a spreader bar assembly when assembled.

14. The assembly of claim 1, wherein the two connecting members are configured for alignment with a corresponding pair of connecting members on a connector element in said assembly.

15. The assembly of claim 14, wherein the connector element is a three-way connector.

16. The assembly of claim 14, wherein the connector element is a four-way connector.

17. A member for an assembly for use with a spreader bar arrangement, a crane, or as part of a building structure, said assembly comprising a plurality of members connectable in an assembled arrangement for supporting, carrying or distributing a load, the member comprising:
a first end and a second end, at least one of the first end and the second end, defined as a mounting end, has a pair of connecting members, each connecting member consisting essentially of two lugs, each lug having a hole therethrough; a first pair of the lugs of the connecting members are located at opposing edges of the mounting end of the member and a second pair of the lugs of the connecting members are vertically spaced from the first pair with each lug in the second pair being horizontally offset from the respective opposing edge of the mounting end of the member, the first and second pair of lugs are each symmetrically arranged about a centerline of the mounting end of the member; and the first pair of lugs and the second pair of lugs are spaced at a different distance from the centerline of the end of the member;
which pair of connecting members are configured for interconnection when inverted 180 degrees about a longitudinal axis of the pair of connecting members with a corresponding pair of identically arranged connecting members formed on another member in said assembly for connection thereto by fasteners.

18. The member of claim 17, wherein the member is a bar or a plate.

19. The member of claim 17, wherein the assembly is a spreader bar assembly.

20. The member of claim 17, wherein the assembly is a frame of a building.

21. The member of claim 17, wherein the lugs on the member are of a blocked construction.

22. The member of claim 17, wherein the two lugs on the member are connected via a tie that is angled.

23. The member of claim 17, wherein the two lugs on the member are blocked.

24. A connector element for connecting two or more members in an assembly for use with a spreader bar arrangement, a crane, or as part of a building structure for supporting, carrying or distributing a load, the connector element comprising:
a central element having at least two mounting surfaces for fixing at least two pairs of connecting members, each connecting member consisting essentially of two lugs that have two respective holes therethrough; a first pair of the lugs of the connecting members are located at opposing edges of each of the mounting surfaces of the central element and a second pair of the lugs of the connecting members are vertically spaced from the first pair with each lug in the second pair being horizontally offset from the respective opposing edges of each of the mounting surfaces of the central element, the first and second pair of lugs are each symmetrically arranged about a centerline of the mounting surfaces of the central element; and the first pair of lugs and the second pair of lugs are spaced at a different distance from the centerline of the end of the member; and
which pair of connecting members are configured for interconnection when inverted 180 degrees about a longitudinal axis of the pair of connecting members with a corresponding pair of identically arranged connecting members formed on another member in said assembly for connection thereto.

25. The connector element of claim 24, wherein the central element comprises three pairs of connecting members for connection to three respective connecting members in the assembly.

26. The connector element of claim 24, wherein the central element comprises four pairs of connecting members for connection to four respective connecting members in the assembly.

27. The connector element of claim 24, wherein the central element comprises six pairs of connecting members for connection to six respective connecting members in the assembly.

28. The connector element of claim 24, wherein the central element comprises eight pairs of connecting members for connection to eight respective connecting members in the assembly.

29. The connector element of claim 24, wherein the connecting members are disposed on spreader bars.

* * * * *